(12) United States Patent
Reich et al.

(10) Patent No.: US 12,464,010 B2
(45) Date of Patent: Nov. 4, 2025

(54) DEVICES, SYSTEMS, AND METHODS FOR AUTONOMOUS THREAT RESPONSE AND SECURITY ENHANCEMENT

(71) Applicant: BlueVoyant LLC, New York, NY (US)

(72) Inventors: Ayal Reich, Ra'anana (IL); Leo Sojref, Jerusalem (IL); Tal Blaustein, Ramat Gan (IL)

(73) Assignee: BlueVoyant LLC, New York, NY (US)

( * ) Notice: Subject to any disclaimer, the term of this patent is extended or adjusted under 35 U.S.C. 154(b) by 0 days.

(21) Appl. No.: 18/880,904

(22) PCT Filed: Jul. 26, 2023

(86) PCT No.: PCT/US2023/071061
§ 371 (c)(1),
(2) Date: Jan. 3, 2025

(87) PCT Pub. No.: WO2024/026371
PCT Pub. Date: Feb. 1, 2024

(65) Prior Publication Data
US 2025/0260715 A1    Aug. 14, 2025

Related U.S. Application Data

(60) Provisional application No. 63/369,582, filed on Jul. 27, 2022.

(51) Int. Cl.
*H04L 9/40* (2022.01)

(52) U.S. Cl.
CPC ...... *H04L 63/1441* (2013.01); *H04L 63/1433* (2013.01); *H04L 2463/146* (2013.01)

(58) Field of Classification Search
CPC ............. H04L 63/1441; H04L 63/1433; H04L 2463/146
See application file for complete search history.

(56) References Cited

U.S. PATENT DOCUMENTS 9,363,280 B1 *  6/2016  Rivlin ................. H04L 63/1441
9,596,266 B1 *  3/2017  Coleman ................. G06F 21/53
(Continued)

FOREIGN PATENT DOCUMENTS

CA    2990910 A1 *  7/2018  ......... H04L 63/1425
CN    113518077 A *  10/2021  ............ H04L 67/56
(Continued)

OTHER PUBLICATIONS

International Search Report and Written Opinion for corresponding International Application No. PCT/US2023/071061, mailed Oct. 24, 2023.

*Primary Examiner* — Sarah Su
(74) *Attorney, Agent, or Firm* — K&L Gates LLP

(57) ABSTRACT

Systems and methods are disclosed for autonomous security enhancement of a tenant network via a managed security service provider (MSSP) server comprising a processor and a memory, with information from a plurality of data sources, the method comprising querying a database or server, upon an encounter with an indicator of compromise (IoC), by a security system, to identify data sources of a plurality of data sources, wherein the data sources include information on the IoC; generating, via the processor, an IoC threat score for the IoC; generating, at least one actionable security enhancement notification based on the IoC threat score; and deploying an automated security response that can comprise displaying the IoC threat score and an actionable security enhancement notification to a user, allowing triggering or disabling of at least one action based on the single IoC threat score.

19 Claims, 9 Drawing Sheets

(56) References Cited

U.S. PATENT DOCUMENTS

| | | | |
|---|---|---|---|
| 11,201,890 B1* | 12/2021 | Coull | G06F 16/9024 |
| 2016/0248805 A1* | 8/2016 | Burns | H04L 63/1416 |
| 2019/0230098 A1* | 7/2019 | Navarro | H04L 63/1433 |
| 2020/0218802 A1* | 7/2020 | Davis | G06F 21/554 |
| 2020/0228563 A1* | 7/2020 | Yampolskiy | H04L 63/1425 |
| 2020/0252421 A1 | 8/2020 | Pendergast et al. | |
| 2020/0327223 A1* | 10/2020 | Sanchez | G06F 21/554 |
| 2021/0006575 A1 | 1/2021 | McLean et al. | |
| 2021/0185074 A1* | 6/2021 | Fitzgerald | H04W 4/02 |
| 2022/0070182 A1 | 3/2022 | Bowditch et al. | |
| 2023/0327223 A1 | 10/2023 | Gibbs et al. | |
| 2024/0372884 A1* | 11/2024 | Zhou | H04L 63/1433 |
| 2024/0414198 A1* | 12/2024 | Weber | G06F 21/566 |
| 2025/0193217 A1* | 6/2025 | Whalen | G06F 9/451 |

FOREIGN PATENT DOCUMENTS

| | | | | |
|---|---|---|---|---|
| CN | 115001849 A | * | 9/2022 | H04L 63/20 |
| CN | 117118764 A | * | 11/2023 | H04L 63/1441 |
| CN | 117857082 A | * | 4/2024 | H04L 63/029 |
| WO | WO-2024026371 A1 | * | 2/2024 | H04L 63/1408 |

\* cited by examiner

400

401 ~ #54534 | AV Bruteforce attack, Windows authentication attack against DST_I ~ 402

INCIDENT

● Needs Your Action — Defacement — - — Whitelist
Status ~ 403  Category ~ 404  Alarm Source ~ 405  Performed Action ~ 406

Overview ~ 407  Evidence ~ 408  Messages ⓪ ~ 409

April 19, 2022 7:50PM IDT — April 19, 2022 7:51PM IDT — a month
Created ~ 410 — Last Updated ~ 411 — Total Time Active ~ 412

ACME\A67381U — High — New York, NY
Hostname ~ 413 — Device Criticality ~ 414 — Asset Location ~ 415

192.168.125.89 — LINUX — ACME\Homer
Device IP ~ 416 — Device Type ~ 417 — Related Username ~ 418

Endpoint — SUSE Linux Enterprise Server
Device Category ~ 419 — Device Type Version ~ 420

FIG. 6

DEVICES, SYSTEMS, AND METHODS FOR AUTONOMOUS THREAT RESPONSE AND SECURITY ENHANCEMENT

CROSS-REFERENCE TO RELATED APPLICATIONS

This application is a U.S. National Stage Entry under 35 U.S.C. § 371 of International Patent Application No. PCT/US2023/071061, filed on Jul. 26, 2023, titled DEVICES, SYSTEMS, AND METHODS FOR AUTONOMOUS THREAT RESPONSE AND SECURITY ENHANCEMENT which claims the benefit of, and priority from U.S. provisional application No. 63/369,582, filed on Jul. 27, 2022, titled "AUTONOMOUS THREAT SCORING AND SECURITY ENHANCEMENT" the disclosures of which are incorporated by reference in their entirety herein.

FIELD

The present technology pertains to systems and methods for autonomous detection and automated management of threats in a managed security service provider environment. In particular, but not by way of limitation, the present technology provides systems and methods for Autonomous Threat Response and Security Enhancement.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a method is provided for autonomous security enhancement of a tenant network via a managed security service provider (MSSP) server comprising a processor and a memory, with information from multiple sources or feeds; the method comprising querying, via the processor, a database or server, upon an encounter with an indicator of compromise (IoC) by a security system, to identify relevant sources or feeds with references to the encountered IoC; generating or calculating, via the processor, based on an output of the querying, an IoC threat score for the encountered IoC, generating, via the processor, at least one actionable security enhancement notification based on the single threat score for the encountered IoC; and displaying, via a user interface, the IoC threat score of the encountered IoC and the actionable security enhancement notification to a user of the security system, wherein the user may trigger or disable one or more actions in the at least one actionable security enhancement notification.

In various aspects the generating of the IoC threat score comprises identifying, for each relevant source or feed, a threat value of the encountered IoC as classified by the relevant source or feed; attaching, for each relevant source or feed, a multiplier to the source or feed's threat value to produce an adjusted threat value, wherein the multiplier is determined based on a reliability score associated with the source or feed; normalizing all adjusted threat values of the relevant sources or feeds; and generating a single threat score for the encountered IoC.

The method for autonomous security enhancement of a tenant network may further comprise deploying an automated security response that may include one or more of automatically adjusting a security threat threshold level, automatically reconfiguring the database to identify other potential malware variants, transmitting notifications to multiple other users of the security system, determining exposure or risks of future exposure of other tenant networks to the IoC, and sequestering one or more tenant networks or portions of networks.

In several aspects the methods discussed also comprise classifying the encountered IoC, at least based on one or more of the generated IoC threat score, a generated confidence score, and a security threat threshold level, as malicious, unknown, or benign, and wherein the user interface may display the classification to the user of the security system.

These, and other objects, features, and characteristics of the present invention, as well as the methods of operation, and functions of the related elements of structure, and the combination of parts, and economies of manufacture, will become more apparent upon consideration of the following description, and the appended claims with reference to the accompanying drawings, all of which form a part of this specification, wherein like reference numerals designate corresponding parts in the various figures. It is to be expressly understood, however, that the drawings are for the purpose of illustration, and description only, and are not intended as a definition of the limits of the invention.

BRIEF DESCRIPTION OF THE DRAWINGS

Various features of the aspects described herein are set forth with particularity in the appended claims. The various aspects, however, both as to organization, and methods of operation, together with advantages thereof, may be understood in accordance with the following description taken in conjunction with the accompanying drawings as follows:

FIG. 6 presents another graphical user interface that displays details on detected threats or indicators of compromise, in accordance with several non-limiting aspects of the present disclosure.

Corresponding reference characters indicate corresponding parts throughout the several views. The exemplifications set out herein illustrate various aspects of the invention, in one form, and such exemplifications are not to be construed as limiting the scope of the invention in any manner.

DETAILED DESCRIPTION

Figure 1:
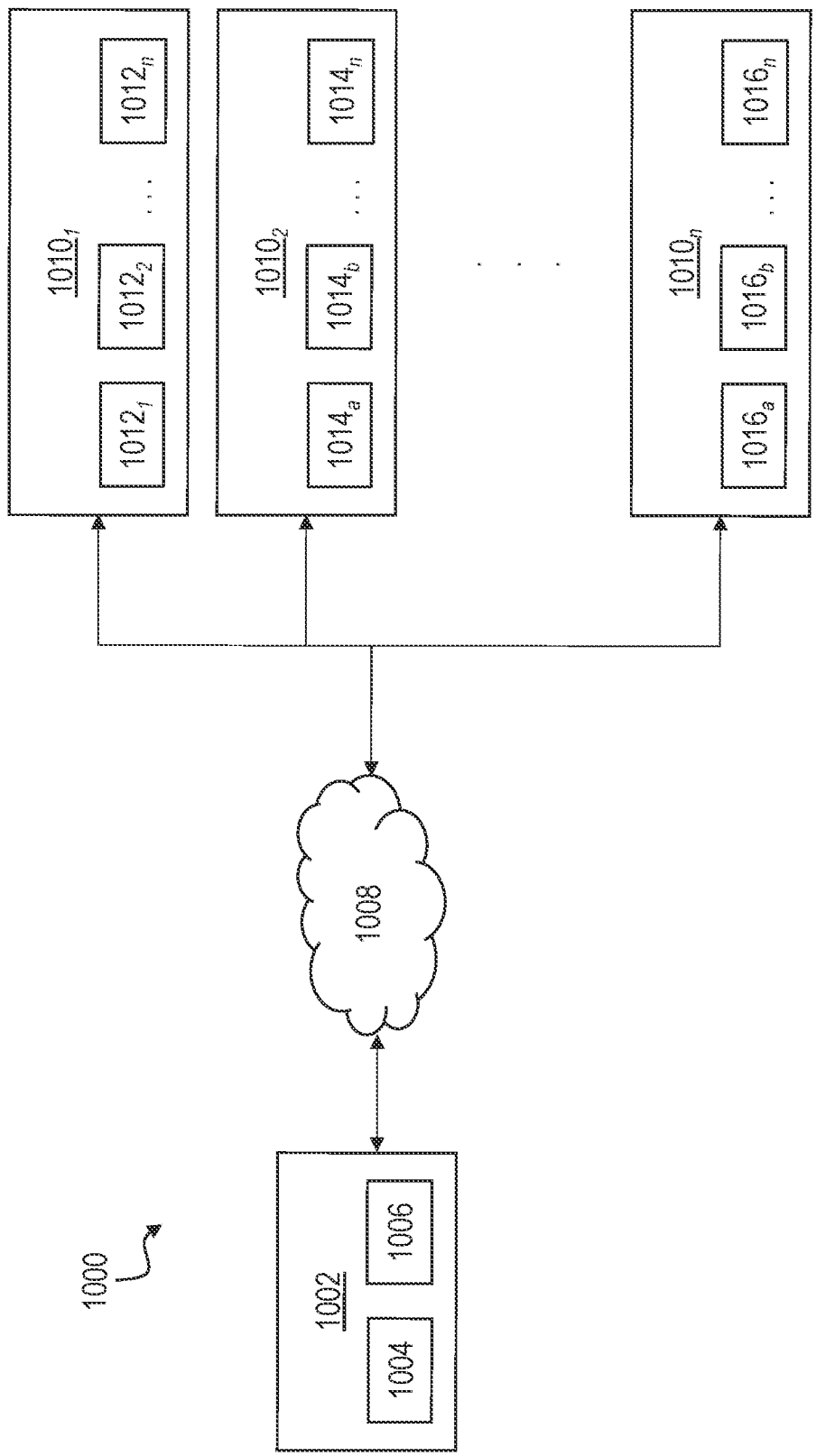
FIG. 1 illustrates a system configured to remotely manage another organization's Security Orchestration, Automation, and Response ("SOAR"), in accordance with at least one non-limiting aspect of the present disclosure.

The Applicant of the present application owns the following U.S. Provisional Patent Applications, the disclosure of each of which is herein incorporated by reference in its entirety:

International Patent Application No. PCT/US2022/072739, titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS, filed on Jun. 3, 2022;

International Patent Application No. PCT/US2022/072743, titled DEVICES, SYSTEMS, AND METHODS FOR STANDARDIZING & STREAMLINING THE DEPLOYMENT OF SECURITY INFORMATION & EVENT MANAGEMENT ARTIFACTS FOR MULTIPLE TENANTS, filed on Jun. 3, 2022;

International Patent Application No. PCT/US2022/082167, titled DEVICES, SYSTEMS, AND METHODS FOR PROVISIONING AND UPDATING SECURITY INFORMATION & EVENT MANAGEMENT ARTIFACTS FOR MULTIPLE TENANTS, filed on Dec. 21, 2022;

International Patent Application No. PCT/US2022/082173, titled DEVICES, SYSTEMS, AND METHODS FOR STREAMLINING AND STANDARDIZING THE INGEST OF SECURITY DATA ACROSS MULTIPLE TENANTS, filed on Dec. 21, 2022;

International Patent Application No. PCT/US2023/061069, titled DEVICES, SYSTEMS, AND METHODS FOR REMOTELY MANAGING ANOTHER ORGANIZATION'S SECURITY ORCHESTRATION, AUTOMATION, AND RESPONSE, filed on Jan. 23, 2023;

International Patent Application No. PCT/US2023/062894, titled DEVICES, SYSTEMS, AND METHODS FOR IDENTIFYING CYBER ASSETS AND GENERATING CYBER RISK MITIGATION ACTION BASED ON DOMAIN REDIRECTS, filed on Feb. 20, 2023;

International Patent Application No. PCT/US2023/021736, titled DEVICES, SYSTEMS, AND METHODS FOR SUMMARIZING ANALYTIC OBSERVATIONS, filed on May 10, 2023;

International Patent Application No. PCT/US2023/022858, titled DEVICES, SYSTEMS, AND METHODS FOR INGESTING & ENRICHING SECURITY INFORMATION TO AUTONOMOUSLY SECURE A PLURALITY OF TENANT NETWORKS, filed on May 19, 2023;

International Patent Application No. PCT/US2023/022535, titled DEVICES, SYSTEMS, AND METHODS FOR IDENTIFYING CYBER ASSETS AND GENERATING CYBER RISK MITIGATION ACTIONS BASED ON A DEMOCRATIC MATCHING ALGORITHM, filed on May 17, 2023;

International Patent Application No. PCT/US2023/024386, titled DEVICES, METHODS, AND SYSTEMS FOR GENERATING A HIGHLY-SCALABLE, EFFICIENT COMPOSITE RECORD INDEX, filed on Jun. 4, 2023;

International Patent Application No. PCT/US2023/068590, titled DEVICES, SYSTEMS, AND METHODS FOR CATEGORIZING, PRIORITIZING, AND MITIGATING CYBER SECURITY RISKS, filed on Jun. 16, 2023;

U.S. Provisional Patent Application No. 63/368,567 titled DEVICES, SYSTEMS, AND METHODS FOR UTILIZING A NETWORKED, COMPUTER-ASSISTED, THREAT HUNTING PLATFORM TO ENHANCE NETWORK SECURITY, filed on Jul. 17, 2022;

U.S. Provisional Patent Application No. 63/369,582 titled AUTONOMOUS THREAT SCORING AND SECURITY ENHANCEMENT, filed on Jul. 27, 2022;

U.S. Provisional Patent Application No. 63/377,304 titled DEVICES, SYSTEMS, AND METHODS FOR CONTINUOUSLY ENHANCING THE IMPLEMENTATION OF CODE CHANGES VIA ENRICHED PIPELINES, filed on Sep. 27, 2022; and U.S. Provisional Patent Application No. 63/507,250 titled DEVICES, SYSTEMS, AND METHODS FOR ATTRIBUTING NETWORK-IMPLEMENTED CYBER ASSETS TO OPERATING ENTITIES AND GENERATING CYBER RISK MITIGATION ACTIONS BASED ON THE ATTRIBUTION, filed on Jun. 9, 2023.

Numerous specific details are set forth to provide a thorough understanding of the overall structure, function, manufacture, and use of the aspects as described in the disclosure, and illustrated in the accompanying drawings. Well-known operations, components, and elements have not been described in detail so as not to obscure the aspects described in the specification. The reader will understand that the aspects described, and illustrated herein are non-limiting aspects, and thus it can be appreciated that the specific structural, and functional details disclosed herein may be representative, and illustrative. Variations, and changes thereto may be made without departing from the scope of the claims. Furthermore, it is to be understood that such terms as "forward", "rearward", "left", "right", "upwardly", "downwardly", and the like are words of convenience, and are not to be construed as limiting terms.

In the following description, like reference characters designate like or corresponding parts throughout the several views of the drawings. Also in the following description, it is to be understood that such terms as "forward", "rearward", "left", "right", "upwardly", "downwardly", and the like are words of convenience, and are not to be construed as limiting terms.

Before explaining various aspects of the systems, and methods disclosed herein in detail, it should be noted that the illustrative aspects are not limited in application or use to the details of disclosed in the accompanying drawings, and description. It shall be appreciated that the illustrative aspects may be implemented or incorporated in other aspects, variations, and modifications, and may be practiced or carried out in various ways. Further, unless otherwise indicated, the terms, and expressions employed herein have been chosen for the purpose of describing the illustrative aspects for the convenience of the reader, and are not for the purpose of limitation thereof. For example, it shall be appreciated that any reference to a specific manufacturer, software suite, application, or development platform disclosed herein is merely intended to illustrate several of the many aspects of the present disclosure. This includes any, and all references to trademarks. Accordingly, it shall be appreciated that the devices, systems, and methods disclosed herein can be implemented to enhance any software update, in accordance with any intended use, and/or user preference.

As used herein, the term "server" may refer to or include one or more computing devices that are operated by or facilitate communication, and processing for multiple parties in a network environment, such as the Internet or any public or private network. Reference to "a server" or "a processor," as used herein, may refer to a previously-recited server, and/or processor that are recited as performing a previous step or function, a different server, and/or processor, and/or a combination of servers, and/or processors.

As used herein, the term "platform" shall include software and/or an ecosystem of physical resources required to enable the technological benefits provided by software. For example, a platform can include either a stand-alone software product, or a software product configured to integrate with other software or physical resources within the ecosystem required for the software to provide its technological benefit. According to some non-limiting aspects, the technological benefit provided by the software is provided to the physical resources of the ecosystem or other software employed by physical resources within the ecosystem (e.g., APIs, services, etc.). According to other non-limiting aspects, a platform can include a framework of several software applications intended and designed to work together.

SIEMs and MSSPs

As used herein, the term "network" shall include an entire enterprise information technology ("IT") system, a tenant "network" applies this term to a client of the MSSP for which the MSSP is providing SIEM services. For example, a network can include a group of two or more nodes (e.g., devices) connected by any physical and/or wireless connection and configured to communicate and share information with the other node or nodes. However, the term network shall not be limited to any particular nodes or any particular means of connecting those nodes. A network can include any combination of devices (e.g., servers, databases, local or cloud storage, desktop computers, laptop computers, personal digital assistants, mobile phones, wearables, smart appliances, etc.) configured to connect to an Ethernet, intranet, and/or extranet and communicate with one another via an ad hoc connection (e.g., Bluetooth®, near field communication ("NFC"), etc.), a local area connection ("LAN"), a wireless local area network ("WLAN"), and/or a virtual private network ("VPN"), regardless of each devices' physical location. A network can further include any tools, applications, and/or services deployed by devices, or otherwise utilized by an enterprise IT system, such as a firewall, an email client, document management systems, office systems, etc. In some non-limiting aspects, a "network" can include third-party devices, applications, and/or services that, although they are owned and controlled by a third party, are authorized by a tenant to access the enterprise IT system.

Security Information, and Event Management (SIEM) includes software configured to aggregate and analyze activity from many different resources across an entire information technology (IT) infrastructure. For example, SIEM can be utilized by SIEM service providers also known as Managed Security Service Providers (MSSP) to aggregate data (e.g., logging data, event data, threat intelligence data, etc.) from multiple systems, and analyze that data to catch abnormal behavior or potential cyberattacks. For example, SIEM may collect security data from network devices, servers, domain controllers, and more. SIEM can be implemented to store, normalize, aggregate, and apply analytics to that data to discover trends, detect threats, and enable organizations to investigate any alerts.

Examples of commonly implemented SIEMs include Azure Sentinel and Splunk Cloud, Devo, LogRhythm, IBM's QRadar, Securonix, McAfee Enterprise Security Manager, LogPoint, Elastic Stack, ArcSight Enterprise Security Manager, InsightIDR, amongst others. Deploying Azure Sentinel as a cloud-based tool, specifically, has become a popular choice amongst managed security service providers ("MSSPs") and therefore, Azure Sentinel will be discussed as a non-limiting example. However, it shall be appreciated that the other SIEMs are contemplated by the present disclosure. Like most SIEMs, deploying Azure Sentinel requires a high level of skill, and, at the same time, it could be very time consuming, and error prone. Each organization that needs a security solution has special needs around monitoring, and alerting, the log sources to ingest, the detection/alert rules, the response automation, reporting, etc. Although Microsoft (MSFT) is often used by MSSPs to manage multiple clients, the complexity of the initial configuration, deployment, and ongoing maintenance of artifacts (e.g., resource groups, log analytics workspaces, alert rules, workbooks, playbooks, etc.), has been increasing significantly. This can result in a high cost for both the MSSP—who must hire more expensive specialists—and for the client, who often bears at least a portion of the increasing expenses. However, there is often an overlap between some of the deployment needs of varying clients. For example, many organizations may require similar firewall monitoring solutions. In such instances, asset reuse, and re-deployment (and update) may lead to major cost reduction, and simplicity of operations. Unfortunately, known SIEM tools are technologically incapable of taking advantage of such synergies. Thus, from the initial provisioning, collection, analyzing, and classifying data, detecting threats and throughout the automation of incident responses, MSSPs are left with limited re-use opportunities to capture efficiencies across multiple clients. Accordingly, there is a need for improved devices, systems, and methods to implement, and issuing SIEM client updates. Such enhancements could improve the technological performance, and cost effectiveness of SIEM, including the deployment of detection rules, visualizations, investigation workbooks, and ongoing maintenance.

Accordingly, there is a need for devices, systems, and methods that employ an automated, "as-a-service" approach to generate and deploy reusable pre-packaged solutions that can be executed in a single step, while delivering full, end-to-end SIEM solutions. Such devices, systems, and methods can deploy a Sentinel implementation with a click of a button with only a minimum understanding of SIEM (e.g., Sentinel, Azure, etc.). Accordingly, such devices, systems, and methods can be used to repeatedly scale cloud-based SIEM implementations with consistency. A user need only provide a location where the entire deployment would take place and/or login credentials for the respective client.

Indicators of Compromise (IoCs)

Although known SIEM tools offer impressive functionality, including the ability to monitor events, collect data, and issue security alerts across a network, the quality of data that is collected and relied upon to undertake these functions is inconsistent and in many cases unreliable. Every MSSP or user of an SIEM service or software has access to and may draw on various sources of information and data (referred to herein as "source" or "data source") that they may use as indicators for files or activity that may be malicious to their clients, secured databases, and networks they provide security services to. These forms of data may contain several discrepancies between different sources, including contradictions on the nature of threats, as well as falsely reported, under-reported, or unreported information.

Furthermore, because of the vast number of data sources utilized by MSSPs that purport to indicate threats and threat indicators (threat indicators are collectively referred to herein as "indicators of compromise" or "IoCs"), it is difficult for a security provider, analyst, or MSSP to address and manage threats to client networks or databases in real-time. Current SIEM software and systems are able to retrieve and receive raw data from numerous data sources but are unable to classify the reliability of the data and/or data sources, prioritize which sources or IoCs should be addressed and in which order, or detect or identify new and un-encountered threats in the data, which means the large amounts of data add layers of complexity to SIEM systems without sufficiently improving their effectiveness in managing threats on tenant networks.

Indicators of compromise discussed may include various known indicators in the art as well as undiscovered or newly discovered indicators. Some examples of IoCs include: evidence of data breach, multiple logins, anomalous DNS requests, unusual inbound/outbound traffic, geographic irregularities regarding incoming requests or traffic, unknown applications being run or executed, large numbers of requests for the same file, and the like. The methods and systems described herein may also apply to indicators of attacks as well and are not limited merely to IoCs.

While concerns regarding the reliability of the large amounts of data and sources available to SIEM software or MSSPs stem partly from the sheer vast volume of IoC data, they also arise because this data may be automatically generated, user-reported, or otherwise poorly vetted, potentially causing both false positives (where benign indicators are flagged as malicious) causing useful processes to be hindered, and false negatives (where malicious indicators are not marked as such) possibly allowing malware to operate unhindered. Furthermore, it is difficult to detect new variants or forms of malware in IoCs. The lack of an ability to adequately rank IoCs, and programmatically account for the varying reliability of various threat intelligence sources has resulted in most established SIEM methods aiming to simplify the security management process by reducing the number of data sources ingested and IoC data handled by the software, provider, and/or security analyst. This is may mean that effective or valid data sources may be discarded in favor of routine or more-familiar sources reducing the potential effectiveness and flexibility of an SIEM service or MSSP to respond to new threats and receive new forms of information.

Accordingly, there is a need for devices, systems, and methods that employ an automated, "as-a-service" approach to generate and deploy reusable pre-packaged solutions that can be executed in a single step, while delivering full, end-to-end SIEM solutions and provide reliable data from reliable data sources that can classify and present data and automate responses that may be deployed at scale over thousands of devices. Such devices, systems, and methods could be deployed for example through a Sentinel implementation with a click of a button with only a minimum understanding of SIEM (e.g., Sentinel, Azure, etc.). Accordingly, such devices, systems, and methods can be used to repeatedly scale cloud-based SIEM implementations with consistency.

The present disclosure contemplates such devices, systems, and methods, all of which provide many technological benefits over conventional MSSP and SIEM platforms and their handling of IoC data and related sources and feeds (also referred to herein as "data source" and "data feed", respectively) A data feed can include a mechanism for users to receive updated data from a data source. It is commonly used by real-time applications in point-to-point settings as well as on the World Wide Web, examples can include a web feed or an RSS feed. A data source can refer to the location, such as a database or server, of where data originates from including data of data feeds.

The present disclosure presents such devices, systems, and methods, all of which provide many technological benefits, which enable MSSPs to deploy, at scale, repeatedly, and consistently, cloud-based SIEM implementations, such as Azure Sentinel implementations, according to one non-limiting aspect. For example, the devices, systems, and methods disclosed herein can provide an effective way to resolve discrepancies between data and data sources, and generate information that can utilize a large number of IoC data while ensuring reliability of the data to be utilized in managing threats effectively in real-time. The presented technologies provide automated methods and systems to aggregate, classify and score data sources, detect and identify new threats, and respond to IoCs in an SIEM environment.

In several embodiments of the presented technologies, the SIEM autonomous security system or MSSP server (hereinafter collectively referred to as "security system") searches for and encounters IoCs in tenant networks, and ascertain whether the IoCs present tangible threats or whether they are benign. The disclosed security systems and methods collect information on IoCs from data sources or feeds and may assign each source or feed a reliability score. These sources or feeds may be periodically collected, updated, aggregated, and indexed in a security system document, database, server, node, or network of the security system (these are hereinafter collectively referred to as "SIEM autonomous security system database" or "security system database" which may indicate one or more databases even when not described in a plural form). These steps may occur once or may be repeated over time to improve and update the data and reliability scores associated with the sources and feeds based on their performance over time. The security system database thus will contain information from and on various sources and feeds, as well as assigned, preset or calculated reliability scores of these sources or feeds, and historical performance scores, wherein each of the sources or feeds may contain information or data on various indicators of compromise. Whenever the security system encounters an IoC in a tenant network, the security system database may be queried by the security system, whereby the security system calculates an IoC threat score, and is able to classify the IoC as a malicious or benign threat and then take additional and autonomous actions as necessary, which may include the transmission of alerts, notifications, recommendations, or the deployment of autonomous security responses.

FIGURES

Referring now to FIG. 1, a block diagram of a system 1000 configured to remotely manage another organization's Security Orchestration, Automation, and Response ("SOAR") is depicted in accordance with at least one non-limiting aspect of the present disclosure.

According to the non-limiting aspect of FIG. 1, the system 1000 can include a SOAR management server 1002 comprising a memory 1006 configured to store a SOAR application (see FIG. 2), and a processor 1004 configured to execute the stored SOAR application (see FIG. 2), as will be discussed in further reference to FIG. 2. For example, the SOAR management server 1002 can be a computational resource either owned or leased by the managed security service provider ("MSSP"). The SOAR management server 1002 can be communicably coupled, via network 1008, to a plurality of tenants $1010_a$, $1010_b$ . . . $1010_n$. Each tenant $1010_1$, $1010_2$ . . . $1010_n$ of the plurality can represent a customer (e.g., organization) contracting with the MSSP. According to the non-limiting aspect of FIG. 1, the network 1008 can include any variety of wired, long-range wireless, and/or short-range wireless networks. For example, the network 1008 can include an internal network, a Local Area Networks (LAN), Wi-Fi®, cellular networks, near-field communication (hereinafter "NFC"), amongst others.

In further reference to FIG. 1, each tenant $1010_1$, $1010_2$ . . . $1010_n$ of the plurality can host one or more instances of one or more clients 1012, 1014, 1016. For example, a first tenant $1010_1$ can include one or more machines implementing one or more client applications $1012_1$, $1012_2$ . . . $1012_n$, a second tenant $1010_2$ can include one or more machines implementing one or more client applications $1014_1$, $1014_2$ . . . $1014_n$, and/or a third tenant $1010_n$ can include one or more machines implementing one or more client applications $1016_1$, $1016_2$ . . . $1016_n$. Each tenant $1010_1$, $1010_2$, and $1010_n$ can include an intranet by which each machine implementing the client applications. For example, each tenant $1010_1$, $1010_2$, and $1010_n$ can each represent a customer, such as an organization, contracting with the MSSP for security services.

Accordingly, the SOAR management server 1002 can be configured to have oversight of each tenant $1010_1$, $1010_2$, and $1010_n$ of the plurality, and thus, is responsible for monitoring, and managing each client application 1012, 1014, 1016 for threats. As previously discussed, the differences, and complexity in tenant $1010_1$, $1010_2$, and $1010_n$ architecture can complicate this, and render it inefficient for the MSSP. Thus, known SOAR tools can leave the tenants $1010_1$, $1010_2$, and $1010_n$ technologically exposed, and thus, vulnerable to attacks. According to non-limiting aspects of the present disclosure, the SOAR management server 1002 can implement a SOAR management application (see FIG. 2) that technologically, and practically addresses these deficiencies by enhancing the ability of the SOAR management server 1002 to manage, and transmit alerts, and client application updates for multiple tenants based on correlated, and synergistic development needs. Moreover, the architecture 2000 of FIG. 2 further illustrates different means of communication between the various modules, tenants and SOAR management server 1002.

Figure 2:
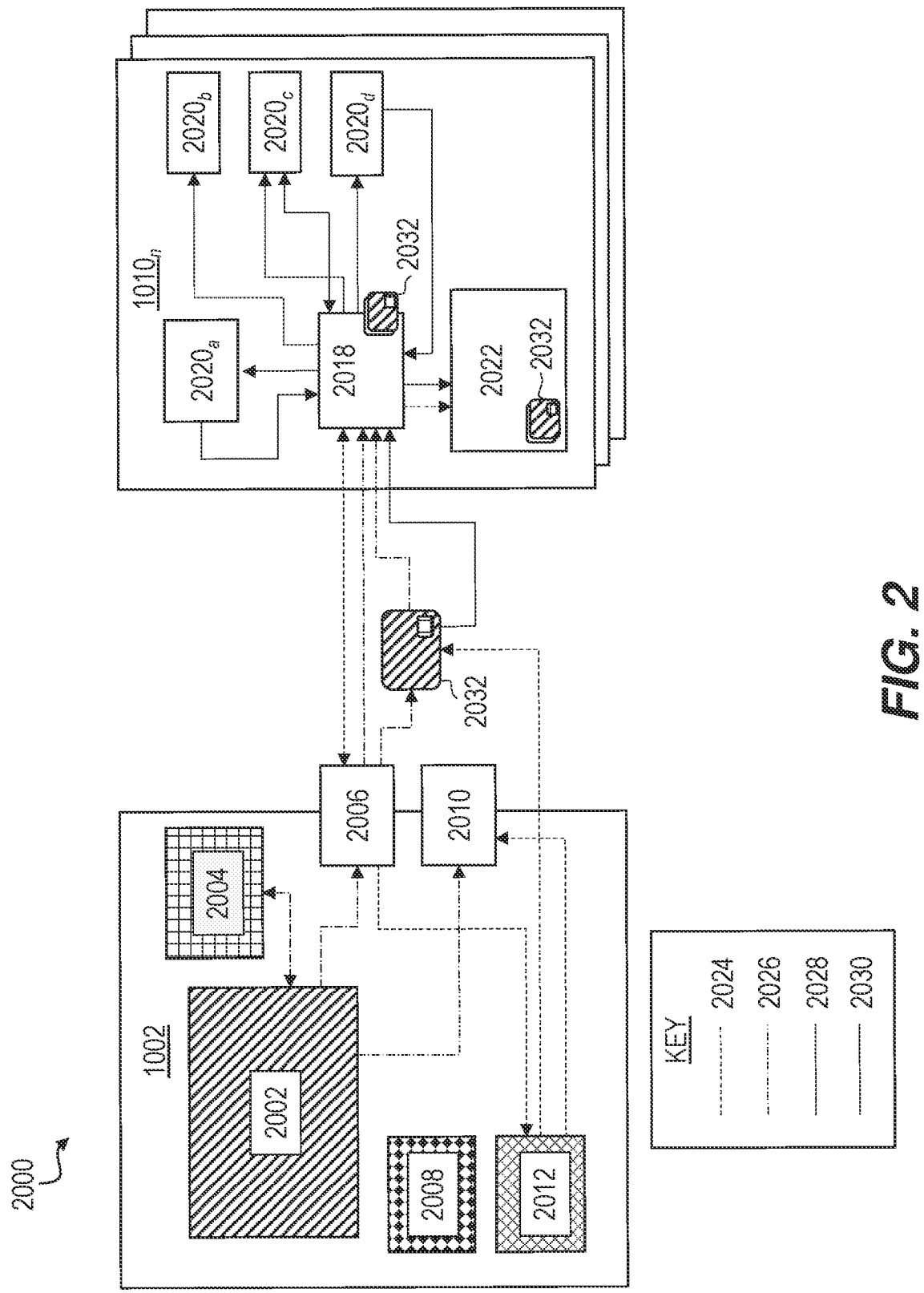
FIG. 2 illustrates a functional architecture of the system of FIG. 1, in accordance with at least one non-limiting aspect of the present disclosure.

Referring now to FIG. 2, a block diagram of a functional architecture 2000 of the system 1000 of FIG. 1 is depicted in accordance with at least one non-limiting aspect of the present disclosure. According to the non-limiting aspect of FIG. 2, the architecture 2000 can include a content library 2002, a variable store 2004, an automation schema 2008, and a service operation engine 2012 collectively provided via an application stored in the memory 1006 (FIG. 1) of the SOAR management server 1002. According to some non-limiting aspects, the SOAR management server 1002 can be remotely located relative to the MSSP and/or tenant $1010_n$. For example, the SOAR management server 1002 may be cloud-based. When executed by the processor 1004 (FIG. 1), the application's content library 2002, variable store 2004, automation schema 2008, and service operation engine 2012 can collectively facilitate the simultaneous configuration, management, and/or control of multiple SOAR platforms 2018 for multiple tenants $1010n$, or client organizations, at scale. Moreover, when executed by the processor 1004 (FIG. 1), the application can support a client organization's SOAR platform 2018 in either an abstract or a dynamic way, as will be described in further detail herein.

According to some non-limiting aspects, the application deployed by the SOAR management server 1002 can be configured as an Azure Sentinel Automation Portal (ASAP), as disclosed in U.S. Provisional Patent Application No. 63/196,458, and PCT application No. PCT/US22/72739 both titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS and filed Jun. 3, 2021, and Jun. 3, 2022 respectively, the disclosure of both of which are hereby incorporated by reference in their entirety. For example, according to one non-limiting aspect, an ASAP portal runtime software code can include server middleware that is responsible for processing the content from the content library 2002, the connections to the SOAR platform 2018, and/or other services, and services requests for the SOAR management server 1002 to deploy, update, and/or read. In other words, the application deployed by the SOAR management server 1002, including the content library 2002, the variable store 2004, and the automation schema 2008, can provide a unified, simplified view of all tenant $1010_{1-n}$ (FIG. 1) deployments, in conjunction with an ability to work with one or multiple tenants $1010_{1-n}$ at the same time.

The content library 2002 can be configured to store various artifacts (e.g., detections, automations, workbooks, alert rules, playbooks, etc.) by which the SOAR management server 1002 can configure and manage a SOAR platform for one or more tenants $1010_n$. According to some non-limiting aspects, the content library 2002 of FIG. 2 can be stored locally relative to the application, meaning it is provided via the memory 1006 (FIG. 1) of the SOAR management server 1002. However, according to other non-limiting aspects, the content library 2002 can be stored on a remote server communicably coupled to the SOAR management server 1002. In still other non-limiting aspects, the content library 2002 can be provided by a third-party provider (e.g., GitHub, GitLab, etc.), similar to those disclosed in U.S. Provisional Patent Application No. 63/196,458 and PCT International Application No. PCT/US22/72739, both of which are titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS, the disclosure of both of which are hereby incorporated by reference in their entirety. In summary, the content library 2002—and more specifically, artifacts stored within the content library 2002—controls rules by which the SOAR management server 1002 can remotely interface with and/or manage a SOAR platform 2018 for the tenant $1010_n$, or client organization. For example, the content library 2002 can store one or more rules and/or a template configured to automate the deactivation of a user account if the SOAR management server 1002 and/or SOAR platform 2018 determines that, based on detected variables throughout the tenant architecture $1010n$, a determined risk score exceeds a predetermined threshold.

According to the non-limiting aspect of FIG. 2, tenant $1010_n$ requirements, such as variability points, that are specific to a particular client organization and/or tenant $1010_n$ architecture can be provided to artifacts stored in the content library 2002. The content library 2002 can achieve this in accordance with a deployable artifact template, as disclosed in U.S. Provisional Patent Application No. 63/196, 458 and PCT International Application No. PCT/US22/72739 titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS filed Jun. 3, 2021, and Jun. 3, 2022, respectively, the disclosure of both of which are hereby incorporated by reference in their entirety. For example, the content library 2002 can contain "JSON" files for defining alert rules, workbooks, playbooks, etc. As new content is added to the content library 2002 or existing content is updated, the changes can be automatically pushed via the SOAR management server 1002 to the SOAR platform 2018 of the tenant $1010_n$. In other words, the SOAR management server 1002, when deployed, can be configured for each tenant's $1010_{1-n}$ (FIG. 1) specific SOAR needs, which will vary based on each tenant's architecture.

The variable store 2004 can be configured to further customize the interface between the SOAR management server 1002 and the tenant $1010_n$, or client organization's architecture. For example, the variable store 2004 can enable a user of the SOAR management server 1002, such as an MSSP, to define and/or link variables associated with the tenant $1010_n$ architecture, as detected by the SOAR management server 1002, to various artifacts stored in the content library 2002, which enhances the ability of the SOAR management server 1002 to automate a client-specific implementation. According to some non-limiting aspects, variables can be stored using a primary key that indicates the destination environment uniquely. For example, when onboarding an environment to be managed, an MSSP, or another user, can indicate admin accounts tied to the environment so that they could be configured when content is being deployed to that particular environment. Accordingly, an automation being deployed may need to be fed which accounts are administrators so that it runs automations specific to those account roles.

The automation schema 2008 can be configured to recognize commonalities between various tenant $1010_{1-n}$ (FIG. 1) architectures and standardize the implementation of the SOAR management server 1002. This represents a significant technological improvement beyond a conventional SOAR management platform, which is configured to either be implemented for a single client organization or would require a significant amount of manual labor to implement across multiple tenants $1010_{1-n}$, or client organizations. For example, conventional SOAR platforms require the assessment of client-specific environments and needs, which requires the design and implementation of a custom solution. The automation schema 2008 of FIG. 2, in conjunction with the content library 2002 and the variable store 2004, enable the SOAR management server 1002 of FIGS. 1 and 2 to automatically generate customized SOAR solutions and scale such solutions across an unprecedented number of tenants $1010_{1-n}$, or client organizations, simultaneously.

The application launched by the SOAR management server 1002 can further include an API broker 2006 and a graphical user interface 2010. For example, the graphical user interface can include one or more platforms to manipulate the authorization settings. The platforms can be third-party applications that act as authentication mechanisms such as, for example, Okta, Duo, and/or Azure AD, amongst others. Once a platform is selected, the graphical interface can display a settings wizard. The settings wizard can include one or more windows, which enable the user to configure various settings for various parameters, such as users, user groups, and/or remediation playbooks. Each window, when selected, can display instructions through which the user can configure the specific settings for that parameter configured to visually present information and receive user inputs via a display and/or a peripheral device (e.g., keyboard, mouse, touchscreen, etc.) communicably coupled to the SOAR management server 1002. For example, the graphical user interface 2010 can be configured to run a wizard through which a user may control the setup and/or automation of the SOAR platform for one or more tenants $1010n$, or client organizations.

In further reference to FIG. 2, an example of one such tenant $1010_n$ architecture is depicted in accordance with at least one non-limiting aspect of the present disclosure. The SOAR management server 1002 can be configured to detect variables associated with the tenant $1010_n$ architecture, as well as design and deploy a tenant $1010_n$ specific configuration including one or more of the modules illustrated in FIG. 2. For example, according to the non-limiting aspect of FIG. 2, the tenant $1010_n$ architecture can include a remote SOAR platform 2018, a dashboard/reporting module 2022, and one or more security tool application program interfaces ("API's") $2020_{a-d}$. Each security tool API $2020_{a-d}$ can be configured to prevent malicious attacks on, or misuse of, a client's API's deployed on the tenant $1010_n$. Because APIs have become key to programming web-based interactions, they have become a target for hackers. Thus, the security tool API's $2020_{a-d}$ can monitor the client's API's and transmit an alert 2030 back to the SOAR platform 2018 if a suspicious event is detected.

According to some non-limiting aspects, the dashboard/reporting module 2022 can include a customizable, visual representation of the tenant's $1010_n$ cyber security. For example, dashboard/reporting module 2022 can enable the MSSP and/or employees of the client organization to see what is happening across the tenant $1010_n$ network and take remedial actions to secure the network in response to identified threats. This can help the MSSP and/or the client organization identify, prevent, mitigate, and/or predict cybersecurity incidents in a significantly more efficient way. Of course, the specific tenant $1010_n$ architecture of FIG. 2 is merely presented for illustrative purposes. According to other non-limiting aspects, the tenant $1010_n$ architecture designed and deployed by the SOAR management server 1002 can be alternately configured to include alternate types and/or quantities of modules. The ability of the SOAR management server 1002—and more specifically, the content library 2002, the variable store 2004, and the automation schema 2008—enables customized SOAR-based solutions that can be remotely managed on behalf of the tenant $1010_n$. Each solution is different, depending on the variables detected by the variable store 2004 and artifacts selected from the content library 2002 based on the detected variables, as deployed by the SOAR management server 1002.

Moreover, the architecture 2000 of FIG. 2 further illustrates different means of communication between the various modules of the SOAR management server 1002 and the one or more tenants $1010n$. For example, certain modules, such as the API broker 2006 may communicate with other modules, such as the service operation engine 2012, the graphical user interface 2010, the remote SOAR platform 2018, and the dashboard/reporting module 2022 via a service layer 2024. Other modules, such as the content library 2002, the variable store 2004, and the API broker 2006, may communicate with the remote SOAR platform 2018 of the tenant $1010_n$ via a management and content delivery layer 2026. The remote SOAR platform 2018 may communicate with the one or more security tool API's $2020_{a-c}$ of the tenant $1010_n$ via a SOAR communication protocol 2028. The one or more security tool APIs may communicate alerts back to the remote SOAR platform 2018 in accordance with rules defined by the applied artifacts 2032 from the content library 2002, as defined by variables from the variable store 2004, via an alert protocol 2030. The influence that the selected artifacts from the content library 2002 and the detected variables from the variable store 2004 have on the artifacts 2032 are illustrated in FIG. 2 via corresponding cross-hatching. In other words, although similar or the same protocols and/or methods can be applied, each means of communication can include different content. Thus, an end user can leverage the architecture 2000 of FIG. 2 either with or without a specific Managed Detection and Response ("MDR") service on top. However, when delivered with a specific MDR service, the same APIs can be used with the specific MDR service users interfacing with the APIs, managing the architecture 2000, and taking actions on behalf of one or more tenants.

As is illustrated in the non-limiting aspect of FIG. 2, the various modules of the architecture of the SOAR management server 1002 may be configured to communicate with, manage, and control the remote SOAR platform 2018 of the tenant $1010_n$ in accordance with specific artifacts 2032 from the content library 2002, which are autonomously selected variables associated with the tenant $1010_n$, as determined by and/or previously stored in the variable store 2004. Accordingly, the content library 2002 and variable store 2004, in conjunction with the automation schema 2008, can enable the SOAR management server 1002 to autonomously generate a custom configuration to integrate with and remotely manage each tenant's $1010_n$ SOAR platform 2018. For example, an artifact 2032 can define the means by which the API broker 2006 and service operation engine 2012 of the SOAR management server 1002 interface with the remote SOAR platform 2018 of the tenant $1010_n$. Additionally, artifacts 2032 can further define the content alerts 2030 and the conditions under which they are sent from the one or more security tool API's $2020_{a-d}$ to the remote SOAR platform 2018.

The SOAR management server 1002, including the content library 2002, variable store 2004, and automation schema 2008, can provide a powerful cloud-based tool by which MSSPs can remotely manage a client organizations SOAR platform 2018. Although the primary interface is the graphical user interface 2010, the API interface 2006 can further allow programmatic control of SOAR platform 2018 management capabilities, which enables a user to deploy content in the form of playbooks, automations, integrations, dashboards, and other SOAR controlling code-based content to remote environments, such as the tenant $1010_n$, through a central interface. Additionally, the content library 2002, variable store 2004, and automation schema 2008 of the SOAR management server 1002 provide features that allow the customization of that content and allow for bespoke deployments based on tenant $1010_n$ specific needs. In other words, the SOAR management server 1002 can provide a modular and extensible way of referencing a stored library of code and content (e.g., the content library 2002) such that options may be autonomously decided at the time of deployment.

For example a user could deploy a series of artifacts stored in the content library 2002, such as playbooks, code, integrations, and/or dashboards, that can enable the integration of a next-generation antivirus ("NGAV") product, an email security product, and/or an identity protection product and subsequently automate the stages of detection, investigation, and response based on controls they received from the user via the graphical user interface 2010. Additionally and/or alternatively, the SOAR management server 1002 can enable a user to automate a portion of the tenant's $1010_n$ architecture or environment. Moreover, the graphical user interface 2010 can enable a user to "opt in" and/or "opt out" of automated features, as presented by the automation schema 2008, via an easy to follow wizard-like, walk through, application. The user can further customize reporting and/or dashboarding features and preferences to be applied via the dashboard/reporting module 2022, which can be packaged for deployment alongside the automated content.

According to some non-limiting aspects, the application launched by the SOAR management server 1002 can be extensible, meaning it can be configured with the ability to extend or stretch in terms of the number of tenants $1010_n$ whose SOAR platforms 2018 it can remotely manage (e.g., scalability) and/or the number of SOAR management capabilities it provides. In other words, the application, including the content library 2002, the variable store 2004 and the automation schema 2008, can be designed to minimize the level of effort required to enable the SOAR management server 1002 to be extended for future use. For example, through an extensibility mechanism provided by the application launched by the SOAR management server 1002, pluggable add-ons configured to enable additional service components and features of the SOAR management server 1002 can be deployed in the future.

According to some non-limiting aspects, the extensibility mechanism can be implemented in various ways to allow plugging in additional SOAR service components. For example, authentication mechanisms, such as DUO, Okta, amongst others, can be supported concurrently (as illustrated via the graphical user interface 4000 of FIG. 4). These authentication mechanisms may not be hard coded, but configuration files can be discoverable (e.g., the main "config" file for each of the authentication mechanisms can be placed in a well-known repository location that is being scanned for new or deleted files). If a new configuration, such as Azure AD, is going to also be supported, the corresponding configuration file for Azure AD will be placed in the same repository location as Duo and Okta configs, and will be discovered by the application management server and presented to users to select from and configure at a client, as needed. The configuration file can comply to a schema defined and understood by this application management tool, and the user interface 4000 (FIG. 4) elements 4002, 4004, 4006 (FIG. 4) can be generated and populated accordingly. Notably, the SOAR applications discussed herein are built in a way to easily be extended with additional configuration capabilities that are not hard coded in its source code, but plugged in dynamically, through new configurations in accordance with this method.

When the user deploys these add-ons via automation, it can trigger the application launched by the SOAR management server 1002 to enable additional subscription-based services on behalf of the MSSP, which can enhance the tenant's $1010_n$ security and health monitoring. Additionally and/or alternatively, the application deployed by the SOAR management server 1002 can be configured to work with existing "unmanaged" content, which may enable at least some discovery and light management of the previous SOAR assets that are already deployed by the tenant $1010_n$, in lieu of generating a completely new and customized tenant $1010_n$ architecture, as is depicted in FIG. 2.

As previously discussed, when executed by the processor 1004 (FIG. 1), the application can be configured to abstractly and/or dynamically manage a client organization's SOAR platform 2018. For example, in an abstract implementation, the SOAR management server 1002 can employ generically-defined artifacts (e.g., automations) that are stored in the content library 2002, as disclosed in U.S. Provisional Patent Application No. 63/196,458 titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS and filed Jun. 3, 2021, the disclosure of which is hereby incorporated by reference in its entirety. Generically-defined artifacts, for example, can include a block of executable code. However, platform-specific implementations can be subsequently provided (e.g., Azure Defender, Crowdstrike, etc.) Abstract automations/playbooks can be written in a generic format and subsequently translated to a specific format upon deployment. For example, an automation/playbook can be created that is particularly configured to deactivate a user's email account in the event of a business email compromise. However, upon actual implementation of that automation/playbook in a particular customer environment, the system 1000 (FIG. 1) and functional architecture 2000 (FIG. 2) disclosed herein can translate generically written content into a version which is specifically implemented for the specific mail application a tenant is using. In this way, content can be generated that can be adapted programmatically to multiple environments without having to rewrite it, unlike convention systems and architectures. Accordingly, the system 1000 (FIG. 1) and functional architecture 2000 (FIG. 2) disclosed herein provides a significant technological solution—flexible formats and interface—to a technological problem—incompatibility of conventional automations/playbooks, which enables users to scale services to a number of tenant's and their authentication mechanisms.

Alternately, in a dynamic implementation, the SOAR management server 1002 can dynamically generate new automation types via the content library 2002, which can be automatically detected by, and displayed for selection via, the graphical user interface 2010 for subsequent deployment. Similarly, new automations, such as endpoint monitoring solutions (e.g., CarbonBlack, etc.), can be added to the content library 2002 for a given automation type, such as those that block the execution of harmful programs detected by the automations (e.g., block executable file automations, etc.). Similarly it may become automatically available to the GUI, and can be deployed to the appropriate client SOARs (that use those security tools).

Upon deployment via the SOAR management server 1002, tenant $1010_n$, or client, specific variability points can be detected by the variable store 2004 and correlated to artifacts stored in the content library 2002. For example, the SOAR management server 1002 has the ability to configure automatic response/remediation actions (e.g., playbooks) for a given configuration. These remediation actions can require an optional step, for example, the tenant may have to first approve the action. So, while the configuration of a remediation automation may involve similar configuration for the actual tasks (e.g., block an account), the approval step may be done manually through a phone call, or an email, or a workflow form (e.g., integration via service tickets). As such, the approval step can be variable (e.g., may or may not exist, and when it exists it may be accomplished in a number of ways), requiring pulling the appropriate code and configuration from the automation repository to configure for this client and SOAR automation.

Thus, at deployment, the variability points can be configured for tenant $1010_n$ specific SOAR needs, based on the network architecture of the tenant $1010_n$. According to one non-limiting aspect, the SOAR management server 1002 may automate the SOAR platform 2018 to block a user account upon detection of a security event based on inputs received by the security tool API's $2020_{a-d}$. For example, the automation may include a number of steps or conditions, such as approval from a tenant $1010_n$ administrative account. During the deployment—for example via a wizard presented via the graphical user interface 2010—the automation may request the user to provide information (e.g., a phone number, a short message service ("SMS") address, an email address, etc.) associated with one or more administrative accounts for the tenant $1010_n$. Thus, particular steps and/or conditions, such as contacting and/or prompting action from the administrative account, can be programmed into the automation via the graphical user interface 2010.

According to one non-limiting aspect, upon running the custom automation, the SOAR management server 1002—and more specifically, the custom automation generated by the SOAR management server 1002—can manage the SOAR platform 2018 to detect a security event based on inputs/alerts received from one or more security tool API's $2020_{a-d}$, and determine that a user account should be blocked. The SOAR management server 1002 can manage the SOAR platform 2018 to notify the administrative account and the automation will wait for approval, and, upon receiving the approval, can continue on to subsequent steps of the automation, ultimately resulting in the removal of the suspect account from the tenant $1010_n$ network. As described earlier, this can be abstracted into the automation type, with specific implementations for each security tool API $2020_{a-d}$ and/or notification method. Removing a suspect account is just one example of actions the SOAR platform 2018 can take to enhance the security of a tenant $1010_n$ network. For example, aside from blocking an account, the SOAR platform 2018 can also delete a suspect file, email to the security administrator, amongst other actions.

Once deployed by the SOAR management server 1002, the artifacts 2032 (e.g., automations) can reside in the tenant's $1010_n$ architecture and, depending on the non-limiting aspect, the MSSP and/or the client can modify the deployed configuration. For example, according to some non-limiting aspects, the client may desire to control the deployed configuration across the tenant $1010_n$ network. However, according to other non-limiting aspects, the client may desire for the MSSP to have exclusive control of the configuration. Regardless, the application deployed by the SOAR management server 1002 can be configured to automatically detect changes made by the MSSP and/or the client and use them for future deployments and/or the management of updates to the already deployed artifacts 2032. According to some non-limiting aspects, such changes can be utilized by an artificial intelligence stored on the memory 1006 (FIG. 1) of the SOAR management server 1002 to adapt one or more artifacts 2032 (e.g., templates, workflows, etc.) in the content library 2002 for enhanced deployments for similar clients and/or architectures.

Accordingly, the content library 2020 can serve as a contribution mechanism that, when deployed by the application on the SOAR management server 1002, along with the graphical user interface 2010 and API broker 2006, can abstractly and/or dynamically detect updates to both the content library 2002 and the client's SOAR platform 2018. These updates can be collectively managed through the SOAR management server 1002, which serves as a central console for the system 1000 (FIG. 1), and can enable unprecedented scalability to manage a great number of clients. As such, the SOAR management server 1002 can remotely manage another client's SOAR platform 2018 with reliability and consistency. Due to its modular design, it can also be "future proofed," allowing users and third party applications to contribute new artifacts 2032 and/or update existing artifacts 2032 them, as third party vendor solutions evolve.

Figure 3:
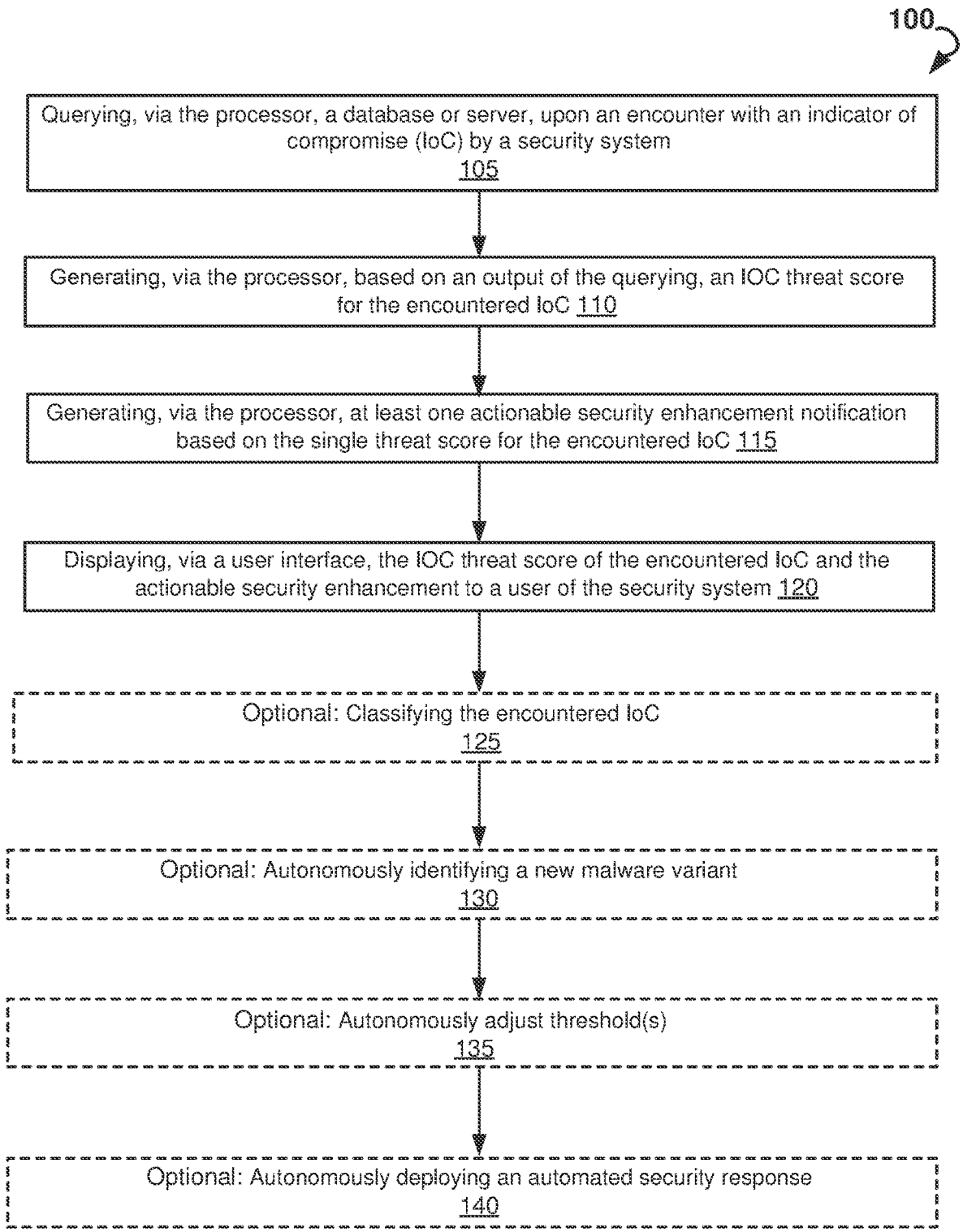
FIG. 3 presents a diagram of a method for autonomous security enhancement of a tenant network via a managed security service provider (MSSP).

FIG. 3 presents a diagram of a method 100 for autonomous security enhancement of a tenant network via a managed security service provider. The method 100 in various aspects may be initiated by the SIEM autonomous security system or MSSP server (hereinafter collectively referred to as "security system") querying 105, a database or server upon encounter of an IoC by the security system, generally in a tenant network. The security system database contains or has received historical and contextual data or information from data sources or feeds, that have been stored and indexed and available to the security system on demand, and so when querying 105 the security system database or network, the system may search through data and information it has access to, and from each source or feed, to identify information on the encountered or other relevant IoCs.

The data sources or feeds by which an IoC is received may each include a pre-set reliability score or value, or a reliability score that has been calculated and/or updated by the security system. This reliability score defines how reliable each data source or feed is, and may be determined automatically by the security system based on data known or available to it, including the level and/or quality of human involvement, the number of IoCs identified by the source or feed, the source or feed's history of reliability (for example, the number of false positives or negatives generated from data obtained from the source or feed), the age of the source or feed, the ages or dates of the IoCs in the source or feed, the reputation of the source or feed in the community or based on community/user reviews, the relevance of the source or feed to a particular tenant or tenant network, the types of tenant network the security system is managing, and the extent of information available to the security system on the source or feed. The query 105 may match or identify the encountered IoC with identical or similar IoCs in the SIEM autonomous security system database as well as identify associated or relevant sources or feed that contain references to or information on the encountered IoC.

After matching or identifying the sources relevant to the encountered IoC, the security system then calculates and/or generates 110 a single IoC threat score/IoC threat score which aims to indicate the level or seriousness of the threat. After the IoC threat score is calculated by the system, an actionable security enhancement notification is generated 115 based on the IoC threat score. The actionable security enhancement notification may be transmitted to a security analyst or other user of the security system, and may comprise recommendations on security management actions that may be taken to secure a network, database, server, or other node belonging to a tenant or under the management of the MSSP.

In various aspects, the actionable security enhancement notification may require that the calculated IoC threat score meet or exceed a specified or pre-set security threat threshold value, and in some aspects different threshold values may be set, the meeting or exceeding of which each result in a different security enhancement notification, response, or actionable recommendation, some of which may be sent to a user or security analyst of the security system, while others may create other automated actions such as logging events or updating a database, or other portion of the tenant network or the security system. In various embodiments of the present disclosure, the IoC threat score, the security threshold, and/or the security enhancement notification or alert may be displayed 120 via a user interface to a user of the security system. The user interface may utilize color coding or other visual effects or techniques for different IoC threat scores, actionable recommendations and the like.

Optionally, an Indicator of compromise may also be classified 125 by the SIEM autonomous security system into one or more categories or as one or more types of threat, the classification may be based on its IoC threat score, threat level, the threshold values it meets, exceeds or otherwise fails to meet, and a generated confidence score for the IoC score. The IoC may be classified as malicious, benign, unknown, or given a different classification of another category or type. The classification may also be sent or displayed to a user or a security analyst of the security system. The classification level may also affect, in various embodiments, the type of recommendation or actionable security enhancement displayed, generated or transmitted by the system.

In several optional aspects, a new malware variant or type of threat may be identified 130 based on one or more of the following factors: the classification of the IoC, the calculated IoC threat score, a calculated IoC confidence interval or value, the security threshold levels that the IoC meets or exceeds, the age of the IoC, the spread and/or distribution of the IoC, and in preferred embodiments, the IoC would share some but not all features of previously encountered IoCs or threats; for example, a new malware variant may be identified if an IoC shares a server of origin with previous malware strains or variants, but itself does not contain the same or identical code, furthermore, the malware may share some but not all behaviors or features (or code) as previous strains, which individually or in combination with the factors listed herein may allow the autonomous security system to identify the new malware variant or other threat.

In response to identifying IoCs, calculating IoC threat scores, and/or classifying the IoC, and to improve the functioning of the security system, the security system may undertake automatic changing or updating false/true positive/negative scores of the sources and feeds used to receive IoC data. The security system may optionally autonomously adjust 135 and update one or more security threat threshold values and levels, and/or source or feed reliability scores by determining one or more ratios comprised of at least two of a number of false positives, a number of true positives, a number of false negatives, and a number of true negatives. This response improves the accuracy and usefulness of the scores to the system to allow it to better deploy responses and processing resources, not only improving response times by more quickly identifying threats with more accurate scores and information, but also more effectively managing system resources based on the immediacy of each encountered threat, employing processing and memory resources for example to more urgent tasks in responding to more immediate threats for example.

In various aspects, the security system may autonomously deploy 140 an automated security response to an identified IoC, identified malware variant, IoC threat score, and/or one or more security threat threshold values based on calculated scores, IoCs or identified values/threat levels. The automated security response may include one or more of any of the following responses: automatically adjust a security threat threshold level, automatically reconfiguring the database to include, automatically identify, or add additionally identified malware variants, automatically transmit notifications to multiple users or security analysts of the security system, determine exposure or risk of future exposure of one or more tenant networks to the identified IoC or new malware variant, and sequester one or more tenant networks or portions of networks to prevent the spreading of malware or viruses or other threats.

Reconfiguring the database can include updating the database automatically, continuously and dynamically, this updating or reconfiguration of a database may be based on multiple factors, including and not limited to: Automatic periodic ingestion of information on new malware variants and emerging threats based on commercial and community threat intelligence, data feeds through industry standard mechanisms (e.g., STIX, API, YARA), information on new malware variants or emerging threats based on malicious or potentially unwanted activity observed in environments monitored through deployed sensors, or based on manually curated feeds of Indicators of Compromise (IOCs) that are maintained by threat intelligence analysts working with the various data sources or feeds. This database reconfiguration allows for quicker identification, matching of, and/or responses to threats and potential malware.

Transmitting notifications automatically to other parts of the network or the SIEM, or to multiple users or analysts of the security system can be achieved in a variety of ways, including and not limited to: creation of time-sensitive output list(s) (for example lookup table(s)) of currently valid IoCs and their respective risk score(s), to allow security systems to automatically correlate raw information obtained from the environment monitored with the risk scoring results calculated by the system. The scoring outputs are exported periodically into a set of structured data that are then fed into a data log analysis and management system that continuously evaluates the incoming data against new the findings from the scoring outputs. Therefore if anything that matches a risk score above a certain threshold is observed in the network, an automatic alert is generated, or one of various automated security responses can be triggered including automated sequestration of a database or network (automatic sequestration may be limited in time or in scope, e.g., number of databases/sequestered networks or portions of databases of networks depending on the IoC threat score) for example to allow time for a human analyst to review it and take further actions.

Output lists and real-time data lookup capabilities allow for both automated and manual lookup of various metrics and factors including indicator or IoC history, risk scoring and origin of a specific indicator as part of an ongoing security incident. In various aspects, this is achieved through an API integration between the security orchestration platform used for incident management and the database(s) that host the indicator risk scoring results. For example, if an artifact was observed as part of an investigation into a certain type of activity in an environment, the orchestration system is allowed to autonomously (and in some aspects allow the security analyst) query the data stored in the risk calculation system for further information about this artifact, and obtain information such as when was the artifact first detected, what rating did the system give it, and what is the risk and the extent of risk associated with the artifact based on the assigned/calculated risk score.

Determining the exposure or risks of future exposure of other tenants or tenant networks can be undertaken by an API connection between the orchestration layer of the security system and the database(s) hosting the scoring algorithm. If an IoC was observed in a client environment and has been determined to be a reliable indication of unwanted or potentially malicious activity, that finding is forwarded to the scoring algorithm through an API call that notes this finding in the database(s). As a result, this raises the risk score assigned to this specific indicator in the database by the next time the risk score is calculated for the IoC in question. Also sequestration of one or more tenant networks or portions of networks can provide benefit to multiple network segments, or even multiple discrete networks, without requiring a connection between them or knowledge of each other.

In most embodiments, if the risk score exceeds a set threshold, the criticality rating of the overall incident will accordingly increase. As a result, the incident will be assigned a higher priority for review by security analysts or for processing resources to be dedicated to it as a more urgent matter in any of the potential responses described above. Additionally, if the client and the service provider have agreed on an arrangement including automated response and threat mitigation capabilities, the higher risk score assigned to an indicator that is associated with a specific incident may trigger an automated response (e.g., endpoint quarantine, interruption of network traffic, and the aforementioned automated responses), the determination of which may otherwise have been less exact. In a different scenario, the capability to verify that a specific indicator is known to be associated with legitimate activity, may result in automated or semi-automated response and threat mitigation activity to be deferred to avoid a potential disruption of legitimate activity related to approved business use of the environment.

Figure 4:
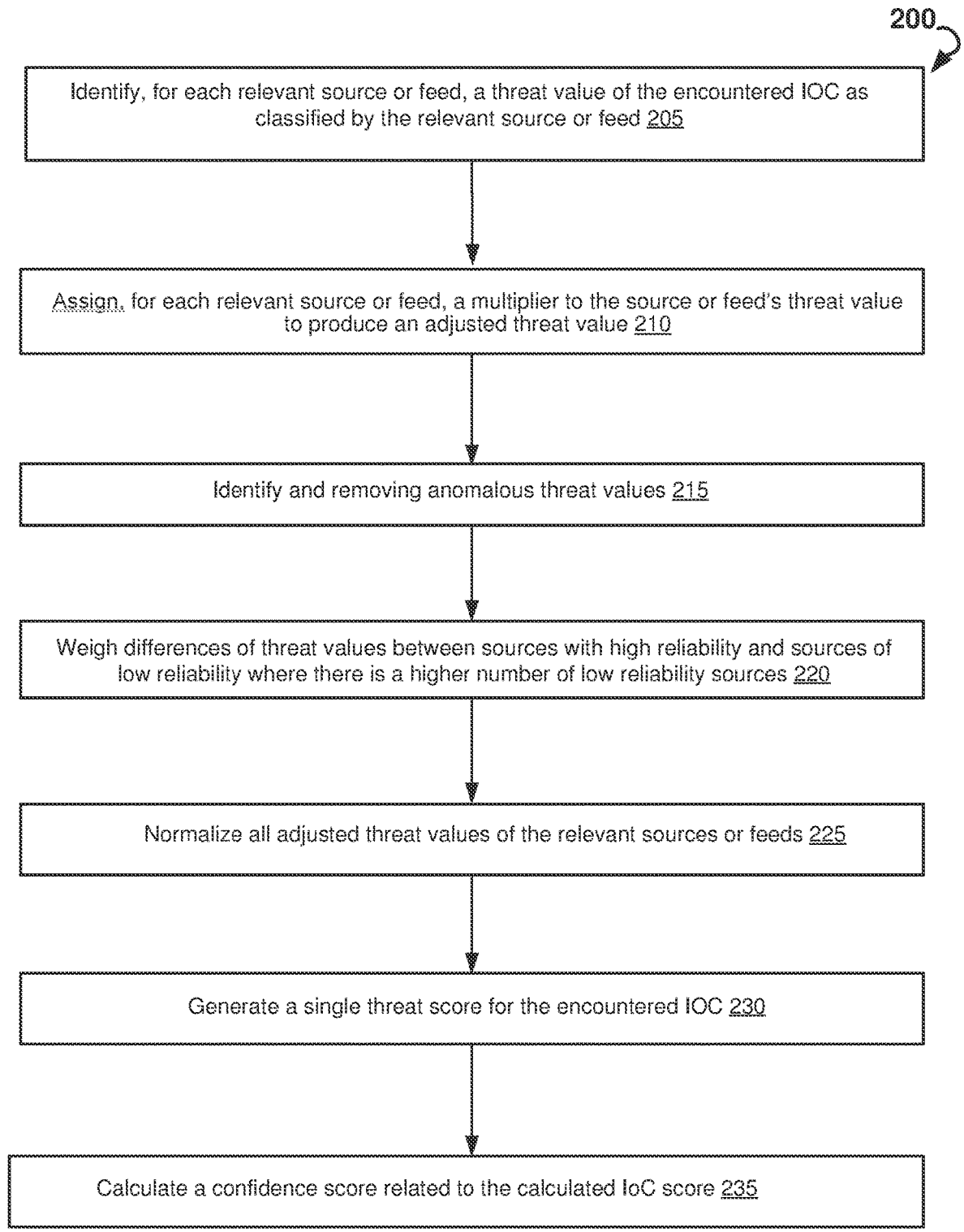
FIG. 4 presents a diagram of an autonomous method for calculating a threat score for an encountered indicator of compromise (IoC).

FIG. 4 presents a diagram of an autonomous method for calculating an encountered indicator of compromise (IoC) threat score. As an IoC is encountered and the security system database is queried as illustrated by FIG. 1, for each source or feed that is identified as being related to the encountered IoC, a threat value/level provided or classified by the relevant source or feed is identified 205 for that IoC. For example, several security feeds may classify an IoC as a $55/100$ threat level, as $8/10$, as moderately malicious, or as benign, or via any other classification system. The security system is able to autonomously identify the threat levels assigned by each security source or feed to each IoC of relevance to the current query, and in many aspects generates a source or feed IoC threat value that is standardized across the different sources or feeds, even if the sources or feeds each use different types or methods of classification. Based on a reliability score of each source of feed that is identified as relevant to the IoC, a multiplier is attached/assigned 210 to the threat value provided by the source or feed to generate an adjusted threat value for the IoC. The multiplier may be directly based on the established or assigned reliability score of the source or feed, or be partially so along with other factors such as the distribution and/or variance between the threat value provided by the source compared to other threat values provided by other sources or feeds, or alternatively/additionally based on internal metrics of the security system relevant to the source or feed or the IoC or type of IoC.

In various aspects of the present technologies, anomalous or outlier threat values (anomalous or outlier threat values can comprise adjusted threat values or anomalous adjusted threat values, that may be identified as anomalous prior to and/or after being adjusted) may be identified and/or removed 215 from the calculation. In the present disclosure, reference to a "threat value" in its broadest sense encompasses an adjusted or a non-adjusted threat value, and/or an anomalous or a non-anomalous threat value, and/or a normalized or a non-normalized threat value. In some embodiments, different types of sources may produce or provide different threat values for a specific IoC, but these differences may stem from differences in the feeds or sources themselves, for example, a large number of publicly generated and freely provided threat values on IoCs may classify a threat value of an IoC as low, while a low number of exclusively available and paid—for professional security services may provide threat values that are high for the same IoC. In such instances the security system may weigh 220 the differences between the two groups to provide a threat value that takes into account publicly generated data and privately generated data, the weighing depending on the specific IoC, its type, the number of IoCs in each source or feed, the threat values provided, the reliability of the sources or feeds, the size of each grouping of closely related sources or feeds, as well as the goals of the security system itself, the weighing may be undertaken to produce or generate a weighted adjusted threat value. This optional step allows the security system to take into account both crowdsourced information from the public as well as information generated privately by specialist security firms, in some instances the system may weigh a threat value or adjusted threat value more heavily towards one grouping of data sources than the other depending on the specific IoC and the factors listed herein. The crowdsourced public information allows the security system to be flexible and take into account information that hasn't yet been curated and professionally organized or adjusted, while the privately generated specialized sources allow the security system to take into account the views of the industry and professionals in the field regarding the threat faced.

Depending on the aspect of the invention, the various threat values and/or the various adjusted threat values may be normalized 225 across all the relevant sources or feeds. A single threat score is then generated 230 for the encountered IoC. In several embodiments, an optional confidence score may also be generated 235 which may be provided along with the single threat score or be incorporated into it. In some aspects, the confidence score may also have to be within a certain threshold for the security system to provide the generated threat score to a security analyst or other user of the system or take any other additional actions as described in FIG. 1. Aspects of the systems and methods presented herein, including the methods to collect and ascertain the reliability of data sources and feeds as well as the determination and calculation of the importance or significance of identified data, and the scoring of that data may be used in various industries and applications which utilize large amounts of data and information, and require that the data and its reliability meet certain threshold levels.

Figure 5:
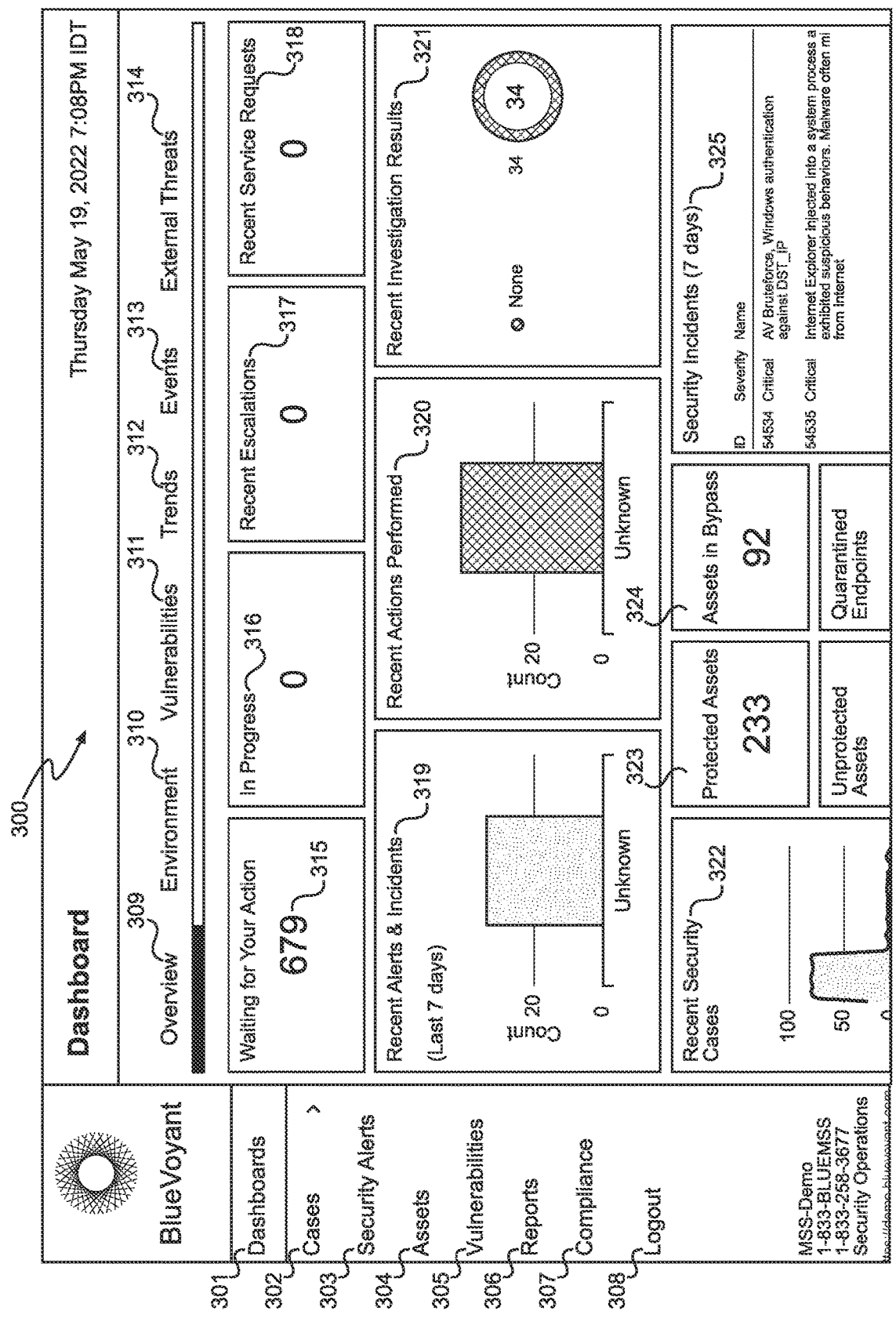
FIG. 5 presents a graphical user interface of the autonomous threat scoring and management application dashboard displaying an overview of threats detected and managed, in accordance with several non-limiting aspects of the present disclosure.

FIG. 5 presents a graphical user interface of the autonomous SIEM threat scoring and management application dashboard displaying an overview of threats detected and managed, in accordance with several non-limiting aspects of the present disclosure. This user dashboard 300 may include a side panel 301 that allows a user such as a security analyst to select another interface dedicated to cases 302 that the system is dealing or has dealt with. The dashboard side panel 301 may also include links to other screens including one for security alerts 303, listing of assets 304, listing of vulnerabilities 305, reports 306, compliance 307 and a clickable log out button 308. The example dashboard may include a few selectable headers including a general overview header 309 to provide a summary or the system's activities, an environment header 310, a vulnerabilities header 311, a trends header 312, an events header 313, and an external threats header 314. When the overview header 309 is selected a screen may be displayed that may include information groupings on the number of pending items awaiting user action 315, items in progress 316, recent escalations 317, recent service requests 318, recent alerts and incidents 319, recent actions performed 320, recent investigation results 321, recent security cases 322, the number of protected assets 323, assets in bypass 324, as well as a listing of security incidents 325. Many of these tabs, lists, and information groupings may include graphical views, charts, tables and graphs.

FIG. 6 presents another graphical user interface and incident screen 400 that displays details on detected threats or indicators of compromise, in accordance with several non-limiting aspects of the present disclosure. In one aspect an incident number 401 is provided along with a description or name of the incident or indicator of compromise 402. The incident status 403 may also be set out in the incident screen, which for example may state that an action is needed by a user, that an incident has been closed, an incident has been resolved and the like. An IoC category 404 may also be provided, including for example 'defacement', or 'DNS anomalies', 'login red flags', and the like. Alarm source(s) 405 may be listed as well, i.e., the source of the detected threat or alarm trigger. Also any performed actions 406 may also be presented. The incident screen 400 may also comprise an overview header 407, an evidence header 408 and a messages header 409. The overview header 407 may contain information on the date/time the incident was created 410, updated 411, the total time 412 the incident has been active, hostname 413, the device's criticality or importance 414, location of assets involved 415, device IP 416, device type 417 which may be related to the software or hardware of the device, related username(s) 418, device category 419 (for example the device is an endpoint), and the device type version 420 which may also be related to both the hardware or software running on the device.

Figure 7:
FIG. 7 presents a graphical user interface that displays details of encountered indicators of compromise, in accordance with several non-limiting aspects of the present disclosure.

FIG. 7 presents a graphical user interface that displays details of encountered indicators of compromise, an IoC screen 500 in accordance with several non-limiting aspect of the present disclosure. The IoC screen 500 includes a list of encountered IoCs 501 with a listing of their names 502, their type 503, for example a 'file', a 'domain', an 'IP', a 'URL', a 'secure hash algorithm' and the like. The IoC screen 500 may also include a list of the reputation of each IoC 504, this may be directly linked to the single IoC score generated by the security system and/or be a classification derived from it, for example unknown, suspicious, malicious, or clean. The IoC reputation 504 may also be related or derived directly from any of the scores, or values calculated or determined or involved in the method to derive the single generated threat score, or otherwise could be reputations provided by the sources or feeds that contain information on the IoC. The IoC screen 500 may also include a designation 505 of each IoC which may include its identity, for example as a specific variant of malware or bot.

Figure 8:
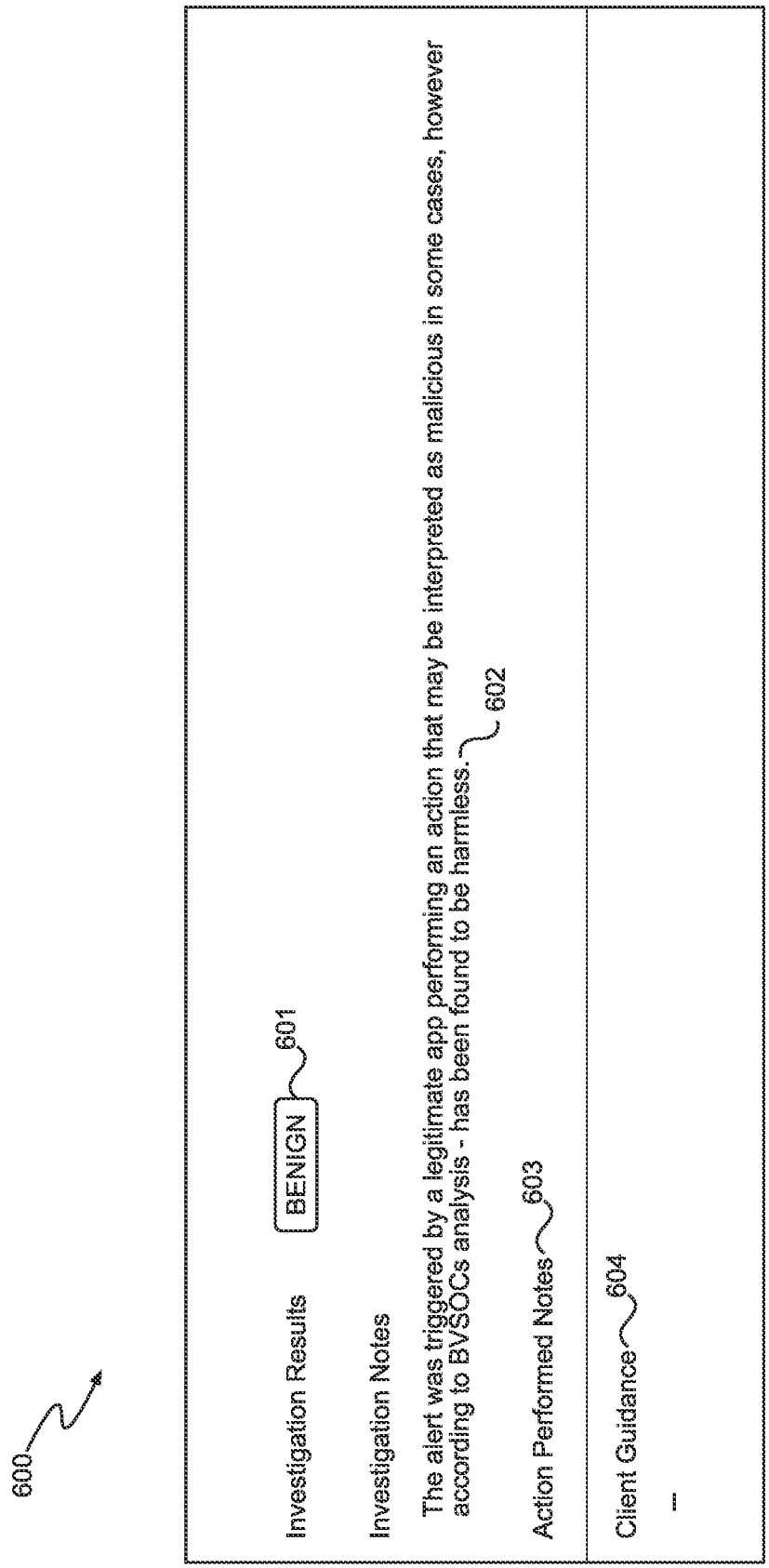
FIG. 8 presents a graphical user interface that provides investigation notes of each indicator of compromise investigated, in accordance with several non-limiting aspects of the present disclosure.

FIG. 8 presents a graphical user interface that provides investigation notes of each indicator of compromise investigated, in accordance with several non-limiting aspect of the present disclosure. The investigation screen 600 may include an investigation result 601 that is derived either from a human user or security analyst or from the automated system itself generated by any of the methods and systems described herein. The investigation screen 600 may also include investigation notes 602 which may summarizes the nature of the IoC, its current status, the history of the IoC and how it triggered an alert, and any actions taken by the system or a user of the system. Action notes 603 may also be provided that are related to the actions taken to counter the IoC, as well as a guidance section 604 to an end user or client on any actions or steps they need to take or any other information that may be relevant to the client or tenant.

Figure 9:
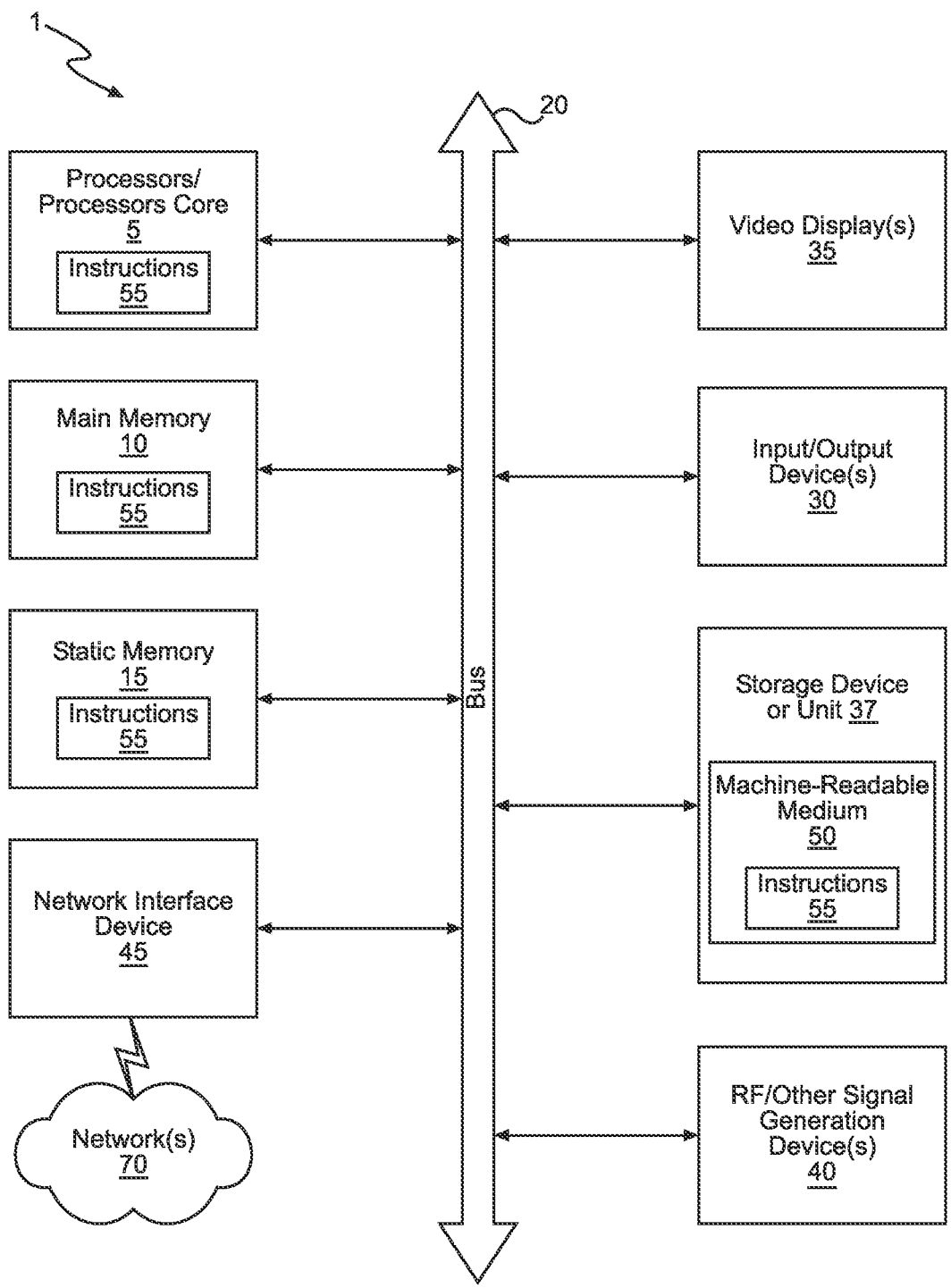
FIG. 9 presents a diagrammatic representation of an example machine in the form of a computer system, within which a set of instructions for causing the machine to perform any one or more of the methods discussed herein in accordance with several non-limiting aspect of the present disclosure may be executed.

FIG. 9 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The components provided in the computer system 1 are those typically found in computer systems that may be suitable for use with embodiments of the present disclosure and are intended to represent a broad category of such computer components that are known in the art. Thus, the computer system 1 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network 70 via the network interface device 45 utilizing any one of several well-known transfer protocols (e.g., Hyper Text Transfer Protocol (HTTP)). While the machine-readable medium 50 is shown in an example embodiment to be a single medium, the term "computer-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the embodiments of the disclosure as described herein.

The computer program instructions may also be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 215 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer device 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

EXAMPLE CLAUSES

Various aspects of the subject matter described herein are set out in the following numbered clauses:

Clause 1: A method for autonomous security enhancement of a tenant network via a managed security service provider (MSSP) server comprising a processor and a memory, with information from a plurality of data sources, the method comprising querying, via the processor, a database or server, upon an encounter with an indicator of compromise (IoC) by a security system, to identify data sources of a plurality of data sources, wherein the data sources comprise references to the IoC; generating, via the processor, based on an output of the querying, an IoC threat score for the IoC, wherein the generating comprises: identifying, for each data source of the data sources, an IoC threat value provided by the data source; assigning, for each data source of the data sources, a multiplier to the IoC threat value provided by the data source to produce an adjusted IoC threat value, wherein the multiplier is based on a reliability score associated with the data source; and normalizing adjusted IoC threat values from the data sources to output the IoC threat score; generating, via the processor, at least one actionable security enhancement notification based on the IoC threat score; and displaying, via a user interface, the IoC threat score and the actionable security enhancement notification to a user, allowing triggering or disabling of at least one action in the at least one actionable security enhancement notification, the at least one action based on the IoC threat score.

Clause 2: The method of clause 1, further comprising: deploying an automated security response, wherein the deploying comprises at least one of: automatically adjusting a security threat threshold level, automatically reconfiguring the database or server to identify potential malware variants, transmitting notifications to multiple other users, determining exposure or risks of future exposure of other tenant networks to the IoC, or sequestering one or more tenant networks or portions of networks, or combinations thereof.

Clause 3. The methods of any one of clauses 1-2, further comprising classifying the IoC as malicious, unknown, or benign based on at least one of the IoC threat score, a generated confidence score, or a security threat threshold level, or combinations thereof, wherein the user interface can display the classification.

Clause 4. The method of any one of clauses 1-3, wherein the security threat threshold is automatically adjusted based on a ratio representing accuracy or precision of the classification of the IoC as malicious or benign, by using a ratio comprising at least two of: a number of false positives, a number of true positives, a number of false negatives, and a number of true negatives.

Clause 5. The method of any one of clauses 1-4, further comprising determining that the IoC is classified as a malicious threat and that the encountered IoC indicator shares a portion of a set of features with other IoCs stored in the database or server; and upon the determining of the IoC as the malicious threat, identifying a new malware variant based on at least one of the IoC threat score, the portion of the set of features, a generated confidence score, and a security threat threshold level, or combinations thereof.

Clause 6. The method of any one of clauses 1-5, further comprising reconfiguring the database to identify the new malware variant based on at least one of one of a feature of the IoC, the IoC threat score, the generated confidence score, the security threat threshold level, or the classification of the IoC, or combinations thereof.

Clause 7. The method of any one of clauses 1-6, wherein the actionable security enhancement notification comprises an indication of a new malware variant on the tenant network, the new malware variant may be determined based on data of other malware.

Clause 8. The method of any one of clauses 1-7, further comprising: receiving data from the data sources, each data source of the data sources associated with at least one IoC, wherein each data source defines a reliability score; and indexing the data sources and their associated at least one IoC in a database or memory component.

Clause 9. The method of any one of clauses 1-8, wherein the reliability score of each data source of the data sources is determined by at least one of a human involvement, a number of IoCs identified by the data source, a history of reliability of the data source, a number of data inputs to the data source, an age of the data source, an age of an IoC in the data source, a reputation related to the data source, relevance of the data source to a client or the user of the security system, and an amount of information available on the data source.

Clause 10. The method of any one of clauses 1-9, wherein the at least one actionable security enhancement notification is based on at least one of the IoC threat score, a generated confidence score, or a security threat threshold level, or combinations thereof.

Clause 11. The method of any one of clauses 1-10, where the querying comprises cross-referencing identified DNS queries and IP addresses with a plurality of IoCs stored in the database, wherein the plurality of IoCs comprise the IoC; and identifying relevant data sources of the data sources, wherein relevancy of the relevant data sources is determined by associations of the relevant data sources with the identified DNS queries and IP addresses.

Clause 12. The method of any one of clauses 1-11, where the querying further comprises identifying DNS queries and IP addresses contacted by machines in a defined computing environment.

Clause 13. The method of any one of clauses 1-12, wherein the generating of the IoC threat score further comprises identifying anomalous IoC threat values; and discarding the anomalous IoC threat values.

Clause 14. The method of any one of clauses 1-13, wherein the generating of the IoC threat score comprises weighing various IoC threat values from data sources with specific reliability scores against IoC threat values from data sources with lower reliability scores.

Clause 15. The method of any one of clauses 1-14, wherein the generating of the IoC threat score is undertaken by at least one of a machine learning neural network, wherein inputs to the machine learning network comprise reliability scores of the data sources, and the IoC threat values provided by the data sources.

Clause 16. The method of any one of clauses 1-15, further comprising generating a convergence score associated with the IoC threat score based on a distribution of the threat values provided by the data sources.

Clause 17. An autonomous security system directed to continual enhancement of one or more tenant networks, the system comprising: a plurality of tenant networks; at least one managed security service provider (MSSP) server comprising a processor and a memory, the memory storing instructions that when executed by the processor, are effective to cause the processor to: query at least one database or server, upon an encounter with an indicator of compromise (IoC) by a security system, to identify data feeds with references to the IoC; generate based on an output of the querying, an IoC threat score for the IoC, wherein the generating comprises: identifying for each data feed of the data feeds, an IoC threat value as classified by the data feed; attaching, for each data feed of the data feeds, a multiplier to the IoC threat value to produce an adjusted IoC threat value, wherein the multiplier is determined based on a reliability score associated with the data feed; and normalizing adjusted IoC threat values of the data feeds; and outputting the IoC threat score; generate at least one actionable security enhancement notification based on the IoC threat score; and display, via a user interface, on at least one display device, connected to the MSSP server, the IoC threat score and the actionable security enhancement notification to a user of the security system, allowing triggering or disabling of at least one action in the at least one actionable security enhancement notification, the at least one action based on the IoC threat score.

Clause 18. The autonomous security system of claim 17, wherein the actionable security enhancement notification comprises an indication of a new malware variant on at least one tenant network of the plurality of tenant networks, wherein the new malware variant is determined based on other malware data.

Clause 19. The autonomous security system of claim 17, wherein when executed by the processor, the stored instructions are further configured to cause the processor to deploy an automated security response comprising at least one of automatically adjusting a security threat threshold level, automatically reconfiguring a database or server to identify other potential malware variants, transmitting notifications to multiple other users of the security system, determining exposure or risks exposure of other tenant networks to a new malware variant, and sequestering at least one tenant network of the plurality of tenant networks.

Clause 20. A method for autonomously enhancing security of a tenant network, comprising querying a security server, upon an encounter by a security system with an indicator of compromise (IoC) in a tenant network of a plurality of tenant networks, to identify data feeds comprising at least one reference to the IoC; generating, via a processor, based on a result of the querying, an IoC threat score for the IoC; based on the IoC threat score, deploying an automated security response by the security system; and displaying, via a user interface, at least one of: the IoC threat score, a status of the automated security response, or an actionable security enhancement notification to a user of the security system, wherein the actionable security enhancement notification facilitates triggering of an additional security response.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference, and the disclosure expressly set forth in the present application controls.

Various exemplary, and illustrative aspects have been described. The aspects described herein are understood as providing illustrative features of varying detail of various aspects of the present disclosure; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the present disclosure. Accordingly, it will be recognized by persons having ordinary skill in the art that various substitutions, modifications, or combinations of any of the exemplary aspects may be made without departing from the scope of the claimed subject matter. In addition, persons skilled in the art will recognize, or be able to ascertain using no more than routine experimentation, many equivalents to the various aspects of the present disclosure upon review of this specification. Thus, the present disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one", and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one", and indefinite articles such as "a" or "an" (e.g., "a", and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A, and B together, A, and C together, B, and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A, and B together, A, and C together, B, and C together, and/or A, B, and C together, etc.). It will be further understood by those within the art that typically a disjunctive word, and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A, and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect,", an embodiment", "one embodiment", "an exemplification," "one exemplification,", and the like means that a particular feature, structure, or characteristic described in connection with the aspect is included in at least one aspect. Thus, appearances of the phrases "in one aspect," "in an aspect," "in an exemplification,", and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example, and without limitation, top, bottom, left, right, lower, upper, front, back, and variations thereof, shall relate to the orientation of the elements shown in the accompanying drawing, and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced, and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits, and by applying ordinary rounding techniques.

Any numerical range recited herein includes all subranges subsumed within the recited range. For example, a range of "1 to 100" includes all sub-ranges between (and including) the recited minimum value of 1, and the recited maximum value of 100, that is, having a minimum value equal to or greater than 1, and a maximum value equal to or less than 100. Also, all ranges recited herein are inclusive of the end points of the recited ranges. For example, a range of "1 to 100" includes the end points 1, and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification, and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material, and the existing disclosure material.

The terms "comprise" (and any form of comprise, such as "comprises", and "comprising"), "have" (and any form of have, such as "has", and "having"), "include" (and any form of include, such as "includes", and "including"), and "contain" (and any form of contain, such as "contains", and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The foregoing detailed description has set forth various forms of the devices, and/or processes via the use of block diagrams, flowcharts, and/or examples. Insofar as such block diagrams, flowcharts, and/or examples contain one or more functions, and/or operations, it will be understood by those within the art that each function, and/or operation within such block diagrams, flowcharts, and/or examples can be implemented, individually, and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry, and/or writing the code for the software, and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein, "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes, and/or devices described herein, or a microprocessor configured by a computer program which at least partially carries out processes, and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware, and/or circuitry configured to perform any of the aforementioned operations. Software may be embodied as a software package, code, instructions, instruction sets, and/or data recorded on non-transitory computer readable storage medium. Firmware may be embodied as code, instructions or instruction sets, and/or data that are hard-coded (e.g., nonvolatile) in memory devices.

As used in any aspect herein, the terms "component," "system," "module", and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities, and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These, and similar terms may be associated with the appropriate physical quantities, and are merely convenient labels applied to these quantities, and/or states.

What is claimed is:

1. A method for autonomous security enhancement of a tenant network via a managed security service provider (MSSP) server comprising a processor and a memory, with information from a plurality of data sources, the method comprising:
   querying, via the processor, a database or server, upon an encounter with an indicator of compromise (IoC) by a security system, to identify data sources of a plurality of data sources, wherein the data sources comprise references to the IoC;
   generating, via the processor, based on an output of the querying, an IoC threat score for the IoC, wherein the generating comprises:
      identifying, for each data source of the data sources, an IoC threat value provided by the data source;
      assigning, for each data source of the data sources, a multiplier to the IoC threat value provided by the data source to produce an adjusted IoC threat value, wherein the multiplier is based on a reliability score associated with the data source; and
      normalizing adjusted IoC threat values from the data sources to output the IoC threat score;
   generating, via the processor, at least one actionable security enhancement notification based on the IoC threat score; and
   displaying, via a user interface, the IoC threat score and the actionable security enhancement notification to a user, allowing triggering or disabling of at least one action in the at least one actionable security enhancement notification, the at least one action based on the IoC threat score.

2. The method of claim 1, further comprising:
   deploying an automated security response, wherein the deploying comprises at least one of: automatically adjusting a security threat threshold level, automatically reconfiguring the database or server to identify potential malware variants, transmitting notifications to multiple other users, determining exposure or risks of future exposure of other tenant networks to the IoC, or sequestering one or more tenant networks or portions of networks, or combinations thereof.

3. The method of claim 1, further comprising:
   classifying the IoC as malicious, unknown, or benign based on at least one of the IoC threat score, a generated confidence score, or a security threat threshold level, or combinations thereof, wherein the user interface can display the classification.

4. The method of claim 3, wherein the security threat threshold is automatically adjusted based on a ratio representing accuracy or precision of the classification of the IoC as malicious or benign, by using a ratio comprising at least two of: a number of false positives, a number of true positives, a number of false negatives, and a number of true negatives.

5. The method of claim 1, further comprising:
   determining that the IoC is classified as a malicious threat and that the encountered IoC indicator shares a portion of a set of features with other IoCs stored in the database or server; and
   upon the determining of the IoC as the malicious threat, identifying a new malware variant based on at least one of the IoC threat score, the portion of the set of features, a generated confidence score, and a security threat threshold level, or combinations thereof.

6. The method of claim 5, further comprising:
   reconfiguring the database to identify the new malware variant based on at least one of one of a feature of the IoC, the IoC threat score, the generated confidence score, the security threat threshold level, or the classification of the IoC, or combinations thereof.

7. The method of claim 1, wherein the actionable security enhancement notification comprises an indication of a new malware variant on the tenant network, the new malware variant may be determined based on data of other malware.

8. The method of claim 1, further comprising:
   receiving data from the data sources, each data source of the data sources associated with at least one IoC, wherein each data source defines a reliability score; and
   indexing the data sources and their associated at least one IoC in a database or memory component.

9. The method of claim 1, wherein the reliability score of each data source of the data sources is determined by at least one of a human involvement, a number of IoCs identified by the data source, a history of reliability of the data source, a number of data inputs to the data source, an age of the data source, an age of an IoC in the data source, a reputation related to the data source, relevance of the data source to a client or the user of the security system, and an amount of information available on the data source.

10. The method of claim 1, wherein the at least one actionable security enhancement notification is based on at least one of the IoC threat score, a generated confidence score, or a security threat threshold level, or combinations thereof.

11. The method of claim 1, where the querying comprises:
cross-referencing identified DNS queries and IP addresses with a plurality of IoCs stored in the database, wherein the plurality of IoCs comprise the IoC; and
identifying relevant data sources of the data sources, wherein relevancy of the relevant data sources is determined by associations of the relevant data sources with the identified DNS queries and IP addresses.

12. The method of claim 11, where the querying further comprises:
identifying DNS queries and IP addresses contacted by machines in a defined computing environment.

13. The method of claim 1, wherein the generating of the IoC threat score further comprises:
identifying anomalous IoC threat values; and
discarding the anomalous IoC threat values.

14. The method of claim 1, wherein the generating of the IoC threat score comprises weighing various IoC threat values from data sources with specific reliability scores against IoC threat values from data sources with lower reliability scores.

15. The method of claim 1, wherein the generating of the IoC threat score is undertaken by at least one of a machine learning neural network, wherein inputs to the machine learning network comprise reliability scores of the data sources, and the IoC threat values provided by the data sources.

16. The method of claim 1, further comprising:
generating a convergence score associated with the IoC threat score based on a distribution of the threat values provided by the data sources.

17. An autonomous security system directed to continual enhancement of one or more tenant networks, the system comprising:
a plurality of tenant networks;
at least one managed security service provider (MSSP) server comprising a processor and a memory, the memory storing instructions that when executed by the processor, are effective to cause the processor to:
query at least one database or server, upon an encounter with an indicator of compromise (IoC) by a security system, to identify data feeds with references to the IoC;
generate based on an output of the querying, an IoC threat score for the IoC, wherein the generating comprises:
identifying for each data feed of the data feeds, an IoC threat value as classified by the data feed;
attaching, for each data feed of the data feeds, a multiplier to the IoC threat value to produce an adjusted IoC threat value, wherein the multiplier is determined based on a reliability score associated with the data feed; and
normalizing adjusted IoC threat values of the data feeds; and
outputting the IoC threat score;
generate at least one actionable security enhancement notification based on the IoC threat score; and
display, via a user interface, on at least one display device, connected to the MSSP server, the IoC threat score and the actionable security enhancement notification to a user of the security system, allowing triggering or disabling of at least one action in the at least one actionable security enhancement notification, the at least one action based on the IoC threat score.

18. The autonomous security system of claim 17, wherein the actionable security enhancement notification comprises an indication of a new malware variant on at least one tenant network of the plurality of tenant networks, wherein the new malware variant is determined based on other malware data.

19. The autonomous security system of claim 17, wherein when executed by the processor, the stored instructions are further configured to cause the processor to:
deploy an automated security response comprising at least one of: automatically adjusting a security threat threshold level, automatically reconfiguring a database or server to identify other potential malware variants, transmitting notifications to multiple other users of the security system, determining exposure or risks exposure of other tenant networks to a new malware variant, and sequestering at least one tenant network of the plurality of tenant networks.

* * * * *